US008118385B2

(12) United States Patent  
Van de Wynckel et al.

(10) Patent No.: US 8,118,385 B2  
(45) Date of Patent: Feb. 21, 2012

(54) METHOD AND APPARATUS FOR AUTOMATICALLY ALIGNING ARRAYS OF PRINTING ELEMENTS

(75) Inventors: Werner Van de Wynckel, Wolvertem (BE); Verhoest Bart, Niel (BE)

(73) Assignee: Agfa Graphics NV, Mortsel (BE)

( * ) Notice: Subject to any disclaimer, the term of this patent is extended or adjusted under 35 U.S.C. 154(b) by 911 days.

(21) Appl. No.: 12/067,401

(22) PCT Filed: Sep. 19, 2006

(86) PCT No.: PCT/EP2006/066484  
§ 371 (c)(1),  
(2), (4) Date: Jun. 24, 2008

(87) PCT Pub. No.: WO2007/039445  
PCT Pub. Date: Apr. 12, 2007

(65) Prior Publication Data  
US 2009/0027433 A1 Jan. 29, 2009

Related U.S. Application Data

(60) Provisional application No. 60/721,792, filed on Sep. 29, 2005.

(30) Foreign Application Priority Data

Sep. 20, 2005 (EP) .................................. 05108660

(51) Int. Cl.  
*B41J 29/38* (2006.01)

(52) U.S. Cl. .................... 347/12; 347/5; 347/8; 347/13; 347/19; 347/37; 347/40

(58) Field of Classification Search ................... 347/5, 8, 347/12–13, 19, 37, 40  
See application file for complete search history.

(56) References Cited

U.S. PATENT DOCUMENTS

| 4,575,729 A | * | 3/1986 | Ayers et al. ..................... 347/49 |
| 4,878,063 A | * | 10/1989 | Katerberg ........................ 347/19 |
| 5,146,242 A | * | 9/1992 | Zielinski ........................ 347/245 |
| 5,838,338 A | * | 11/1998 | Olson ............................... 347/8 |

(Continued)

FOREIGN PATENT DOCUMENTS

EP      1 674 279 A1    6/2006

(Continued)

OTHER PUBLICATIONS

Official communication issued in counterpart International Application No. PCT/EP2006/066484, mailed on Dec. 8, 2006.

(Continued)

*Primary Examiner* — Ryan Lepisto  
*Assistant Examiner* — Guy Anderson  
(74) *Attorney, Agent, or Firm* — Keating & Bennett, LLP

(57) ABSTRACT

A method and apparatus for aligning the printing of dots generated by at least one array of printing elements in an printing apparatus, wherein the method includes the steps of printing a calibration test pattern, scanning the printed calibration test pattern, determining at least one calibration value based on the scanned calibration test pattern, positioning an alignment adjustment tool relative to the array of printing elements of which the alignment needs to be adjusted and, based on the calculated calibration value, automatically adjusting the alignment of the array of printing elements using the alignment adjustment tool.

8 Claims, 17 Drawing Sheets

U.S. PATENT DOCUMENTS

| | | | |
|---|---|---|---|
| 5,973,842 A * | 10/1999 | Spangenberg | 359/619 |
| 6,102,509 A * | 8/2000 | Olson | 347/8 |
| 6,232,999 B1 * | 5/2001 | Kerr et al. | 347/241 |
| 6,290,319 B1 * | 9/2001 | Boleda et al. | 347/19 |
| 6,457,800 B1 * | 10/2002 | Bohm et al. | 347/19 |
| 6,554,398 B2 * | 4/2003 | Wyngaert et al. | 347/42 |
| 6,663,222 B2 * | 12/2003 | Verhoest et al. | 347/40 |
| 2002/0126169 A1 | 9/2002 | Wyngaert et al. | |

FOREIGN PATENT DOCUMENTS

| | | |
|---|---|---|
| WO | 2007/039444 A1 | 4/2007 |
| WO | 2007/039447 A1 | 4/2007 |

OTHER PUBLICATIONS

Van De Wynckel et al.; "A Method and Apparatus for Automatically Aligning Arrays of Printing Elements"; U.S. Appl. No. 12/067,395, filed Mar. 19, 2008.

Van De Wynckel et al.; "A Method and Apparatus for Digital Printing With Preservation of the Alignment of Printed Dots Under Various Printing Conditions"; U.S. Appl. No. 12/067,391, filed Mar. 19, 2008.

* cited by examiner

METHOD AND APPARATUS FOR AUTOMATICALLY ALIGNING ARRAYS OF PRINTING ELEMENTS

CROSS-REFERENCE TO RELATED APPLICATIONS

This application is a 371 of PCT/EP2006/066484, filed Sep. 19, 2006. This application claims the benefit of U.S. Provisional Application No. 60/721,792, filed Sep. 29, 2005, which is incorporated by reference herein in its entirety. In addition, this application claims the benefit of European Application No. 05108660.1, filed Sep. 20, 2005, which is also incorporated by reference herein in its entirety.

BACKGROUND OF THE INVENTION

1. Field of the Invention

The present invention relates to a solution for automatically aligning one or more arrays of printing elements in a printing apparatus. More specifically the present invention is related to the automatic alignment of ink jet print heads in an ink jet printing system.

2. Description of the Related Art

Inkjet printing is a non-impact method for producing images by the deposition of ink droplets in a pixel-by-pixel manner into an image-recording element in response to digital signals. There are various methods which may be utilized to control the deposition of ink droplets on the receiver member to yield the desired image. In one process, known as drop-on-demand inkjet printing, individual droplets are ejected as needed on to the recording medium to form the desired image. Common methods of controlling the ejection of ink droplets in drop-on-demand printing include piezoelectric transducers and thermal bubble formation using heated actuators. With regard to heated actuators, a heater placed at a convenient location within the nozzle or at the nozzle opening heats ink in selected nozzles and causes a drop to be ejected to the recording medium in those nozzles selected in accordance with image data. With respect to piezoelectric actuators, piezoelectric material is used in conjunction with each nozzle and this material possesses the property such that an electrical field when applied thereto induces mechanical stresses therein causing a drop to be selectively ejected from the nozzle selected for actuation. The image data provided as signals to the print head determines which of the nozzles are to be selected for ejection of a respective drop from each nozzle at a particular pixel location on a receiver sheet.

In another process known as continuous inkjet printing, a continuous stream of droplets is discharged from each nozzle and deflected in an imagewise controlled manner onto respective pixel locations on the surface of the recording member, while some droplets are selectively caught and prevented from reaching the recording member. Inkjet printers have found broad applications across markets ranging from desktop document and pictorial imaging to short run printing and industrial labeling.

A typical inkjet printer reproduces an image by ejecting small drops of ink from the print head containing an array of spaced apart nozzles, and the ink drops land on a receiver medium (typically paper, coated paper, etc.) at selected pixel locations to form round ink dots. Normally, the drops are deposited with their respective dot centers on a grid or raster, with fixed spacing in the horizontal and vertical directions between grid or raster points. The inkjet printer may have the capability to either produce only dots of the same size or of variable size. Inkjet printers with the latter capability are referred to as (multitone) or gray scale inkjet printers because they can produce multiple density tones at each selected pixel location on the page.

Inkjet printers may also be distinguished as being either pagewidth printers or swath (scanning) printers. Pagewidth printers are equipped with a pagewidth print head or print head assembly capable of printing one line at a time across the full width of a page. The line is printed as a whole as the page moves past the pagewidth print head while the print head is stationary. Pagewidth printers are also referred to as single pass printers because the image area is printed in only one pass of the page past the print head. An example of a pagewidth printer is the :Dotrix Modular printer commercially available from Agfa Graphics NV (Belgium).

Swath printers on the other hand use multiple passes to print an image. In each pass a swath of the image is printed on the page. The width of a swath typically is linked to the print width of the print head or print head assembly used for printing the swath while passing across the page. Between such passes the page is advanced relative to a position of the print head so that a next pass of the print head across the page prints a next swath of the image next to or (partially) overlapping the already printed swath. In swath printers a print head is traversed in a fast scan direction during a pass across the page to be printed. Often the traversal is perpendicular to the direction of the arrangement of the array of nozzles of the print head. The page to be printed moves in a slow scan direction, typically perpendicular to the fast-scan direction. An example of a swath printer is the :Anapurna large format printer commercially available from Agfa Graphics NV (Belgium).

Print heads or print head assemblies used in both pagewidth printers and swath printers may include multiple arrays of nozzles mounted together as a single module in a print head or print head assembly. The arrays may be arranged in an interleaved position along the fast scan direction to increase print resolution or may be arranged to abut each other to increase the print (swath) width of the print head. The arrays may be arranged after each other with their respective nozzles in line with each other along the print direction. The first types of arrangements are often used to create improved monochrome print head assemblies, whereas the latter arrangement is often used in the design of multicolor print head assemblies.

To create pleasing printed images, the dots printed by one nozzle array must be aligned such that they are closely registered relative to the dots printed by the other nozzle arrays. If they are not well registered, then the maximum density attainable by the printer will be compromised, banding artifacts will appear and inferior color registration will lead to blurry or noisy images and overall loss of detail. These problems make good registration and alignment of all the nozzle arrays within an inkjet printer critical to ensure good image quality. That is, not only should a nozzle array be well registered with another that jets the same color ink, but it should be well registered with nozzle arrays that jet ink of other colors.

In addition to good image quality, faster print rates are desired by customers of inkjet printers. For swath printers, a well-known means by which to accomplish high productivity is to increase the number of nozzles. One way in which nozzle count may be increased is by simply adding extra nozzle arrays. This has the advantage that the same print head design may be used. However, this adds to the number of nozzle arrays that must be aligned, thereby increasing the possibility for misalignment and the labor required to properly align all the nozzle arrays.

An alternative to gain higher productivity is to increase the nozzle count within a nozzle array. This does not increase the count of nozzle arrays, but usually results in longer nozzle arrays as increasing the nozzle density of a nozzle array typically requires a completely new print head design and/or a new manufacturing process. Longer nozzle arrays also increase the difficulty of alignment of the nozzle arrays as the sensitivity to angular displacements increases proportionately.

In high-end inkjet printers, such as one that might be used in a wide-format application, there are still other considerations that must be made to ensure proper alignment of the nozzle arrays. For instance, bi-directional printing in the fast-scan direction to increase productivity requires that the nozzle arrays be properly aligned whether traveling in the right-to-left direction or the left-to-right direction.

Some high-end printers accept a variety of ink- receiving materials that may differ significantly in thickness. As a result, the printer may have several allowable discrete gaps between the nozzle arrays and the printer platen to accommodate these different receivers. Invariably, the gap between the nozzle arrays and the top of the receiver, referred to as the throw-distance, can vary significantly because of the range of receiver thicknesses and the limited number of discrete nozzle array heights. Due to the carriage velocity, the flight path of the drop is not straight down but really is the vector sum of the drop velocity and carriage velocity. This angular path and the differences in throw-distance make nozzle array registration sensitive to both the average of throw-distance as well as the variation in the throw-distance. These sensitivities further complicate the nozzle array alignment process.

Additionally, some high-end printers allow the customer to select different carriage velocities, with higher carriage velocities resulting in increased productivity usually at the expense of image quality. The term "carriage velocities" implies the supporting of the print heads upon a carriage support that moves in the fast-scan direction while being supported for movement by a rail or other support. The angular flight path of the droplets described will be a function of the carriage velocity. This then makes nozzle array alignment sensitive to yet another variable, namely carriage velocity.

Current alignment techniques fall within two varieties. Visual techniques use patterns printed by the printer that permit a user to simultaneously view various alignment settings and choose the best setting. Visual techniques are disadvantaged in many ways. Firstly, for a printer with many nozzle arrays (twenty-four separate nozzle arrays is not uncommon), multiple throw-distances, and multiple carriage velocities, the number of alignments can become overbearing as each variation adds multiplicatively to the rest. Secondly, only a moderate level of accuracy is attainable with most of these techniques and finely tuned printers require a higher degree of accuracy than is attainable by most of these techniques. Thirdly, interactions can occur between the various alignment parameters, which further degrade the ultimate quality of alignment that can be obtained through these visual techniques, or multiple iterations are required, thereby increasing the labor of the effort. Lastly, since several of these techniques usually operate by providing several alignment settings to the operator who then chooses the best choice, significant amounts of consumables (ink and media) may be required to obtain satisfactory alignment of all nozzle arrays in all print modes.

The second way nozzle arrays are typically aligned is with an on-carriage optical sensor that interprets patterns printed by the nozzle arrays to automatically make adjustments to the nozzle array alignment. While much improved over the more common visual techniques, these methods, too, have several shortcomings. Firstly, the optical sensors are typically of the LED variety with economical optics and cannot provide the high degree of accuracy required of finely tuned, high-end printers. Secondly, these sensors require significant averaging to create a reliable signal, making the amount of receiver required to perform the alignment larger than one would desire. Furthermore, this high degree of averaging necessitates a separate measurement for each nozzle array, requiring even more ink and receiver as the number of nozzle arrays increases. Thirdly, these on-carriage optical sensors are typically arranged to provide data primarily in the fast-scan direction. For demanding applications, slow-scan adjustments are equally important. Some techniques provide means by which slow-scan misalignments may be determined, but these measurements require separate, additional patterns, further consuming additional ink and receiver. Furthermore, this fast-scan limitation makes determination of nozzle array skew very difficult or impossible. Another result of the fast-scan directional limitation is the inability to measure errors in the movement of the receiver, yet another critical alignment variable.

It is therefore desired to develop a nozzle array alignment technique and process that provides a high degree of accuracy of alignment of all critical alignment variables while requiring very little labor and time to execute and consuming as little ink and receiver as possible.

SUMMARY OF THE INVENTION

In order to overcome the problems described above, preferred embodiments of the present invention provide a method and apparatus for aligning the printing of dots generated by one or more arrays of printing elements wherein a calibration test pattern is printed, scanned and processed, and wherein the alignment of the one or more arrays of printing elements is automatically adjusted by an alignment adjustment tool based on a calibration value derived from processing the scanned calibration test pattern.

In a preferred embodiment of the present invention, the alignment adjustment tool may be positioned in x, y, and z directions relative to the alignment adjustment tool associated with the array of printing elements of which the alignment needs to be adjusted, and automatically adjusts the alignment of the array of printing elements based on a calculated calibration value derived from processing the printed calibration test pattern.

In another preferred embodiment of the present invention, the alignment adjustment tool includes an automatic screwdriver.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 3 shows the side of the print head positioning device along which a print head is inserted (mounting part) while FIG. 4 shows the side of the print head positioning device along which the print head position may be adjusted.

DETAILED DESCRIPTION OF PREFERRED EMBODIMENTS

While the present invention will hereinafter be described in connection with preferred embodiments thereof, it will be understood that the present invention is not limited to the preferred embodiments.

Figure 1:
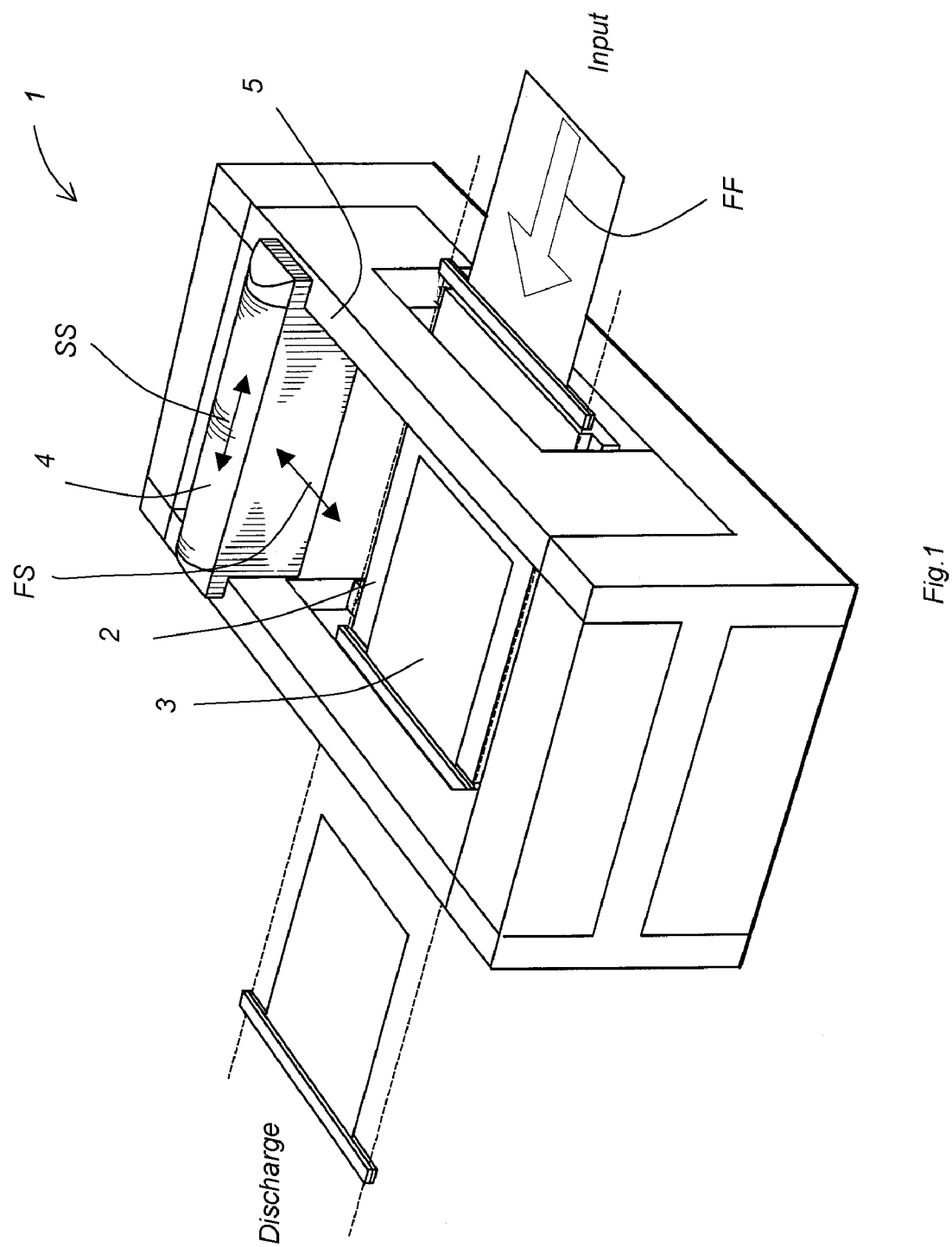
FIG. 1 shows an ink jet printing system in which a preferred embodiment of the present invention may be used.

A digital printer utilizing a preferred embodiment of the present invention is shown in FIG. 1. The digital printer 1 includes a printing table 2 arranged to support a printing medium 3 during digital printing. The term printing medium is equivalent to terms including printing substrate, receiver, etc. which is frequently used in the literature on printing. The printing table is substantially flat and can support flexible sheets of media with a thickness as low as tens of micrometers (e.g., paper, transparency foils, adhesive PVC sheets, etc.), as well as rigid substrates with a thickness up to some centimeters (e.g., hard board, PVC, carton, etc.). A print head shuttle 4, including one or more print heads, is designed for reciprocating back and forth across the printing table in a fast scan direction FS and for repositioning across the printing table in a slow scan direction SS perpendicular to the fast scan direction. Printing is performed during the movement of the print head shuttle in the fast scan direction. Repositioning of the print head shuttle in the slow scan direction, in order to position the print heads in line with non-printed or only partially printed areas of the printing medium, is performed in between fast scans of the print head shuttle. This repositioning may also be used in situations where the print head shuttle is equipped to print a full-width printing medium in a single fast scan operation, e.g., when using print quality enhancement techniques like shingling methods. During the printing, the printing table and the printing medium supported thereon remains in a fixed position. A support frame 5 guides and supports the print head shuttle during its reciprocating operation. A printing medium transport system can feed individual printing sheets into the digital printer along a sheet feeding direction FF that is substantially perpendicular to the fast scan direction of the print head shuttle, as shown in FIG. 1. The printing medium transport system is designed as a "tunnel" or "guide through" through the digital printer, i.e., it can feed media from one side of the printer (the input end in FIG. 1), position the sheet on the printing table for printing, and remove the sheet from the printer at the opposite side (the discharge end in FIG. 1).

Alternatively to using a sheet-based medium transport system, the digital printer may also be used with a web-based medium transport system. The printing medium transport may feed web media into the digital printer from a roll-off at the input end of the digital printer to a roll-on at the discharge end of the digital printer. In the digital printer the web is transported along the printing table that is used to support the printing medium during printing. In the particular case of a web-based medium transport with a printing medium feeding direction equal to the slow scan direction, the repositioning of the print head shuttle along the slow scan direction may be replaced by a repositioning of the web in the feeding direction. The print head shuttle then only reciprocates back and forth across the web in the fast scan direction.

Shuttle Structure

Figure 2:
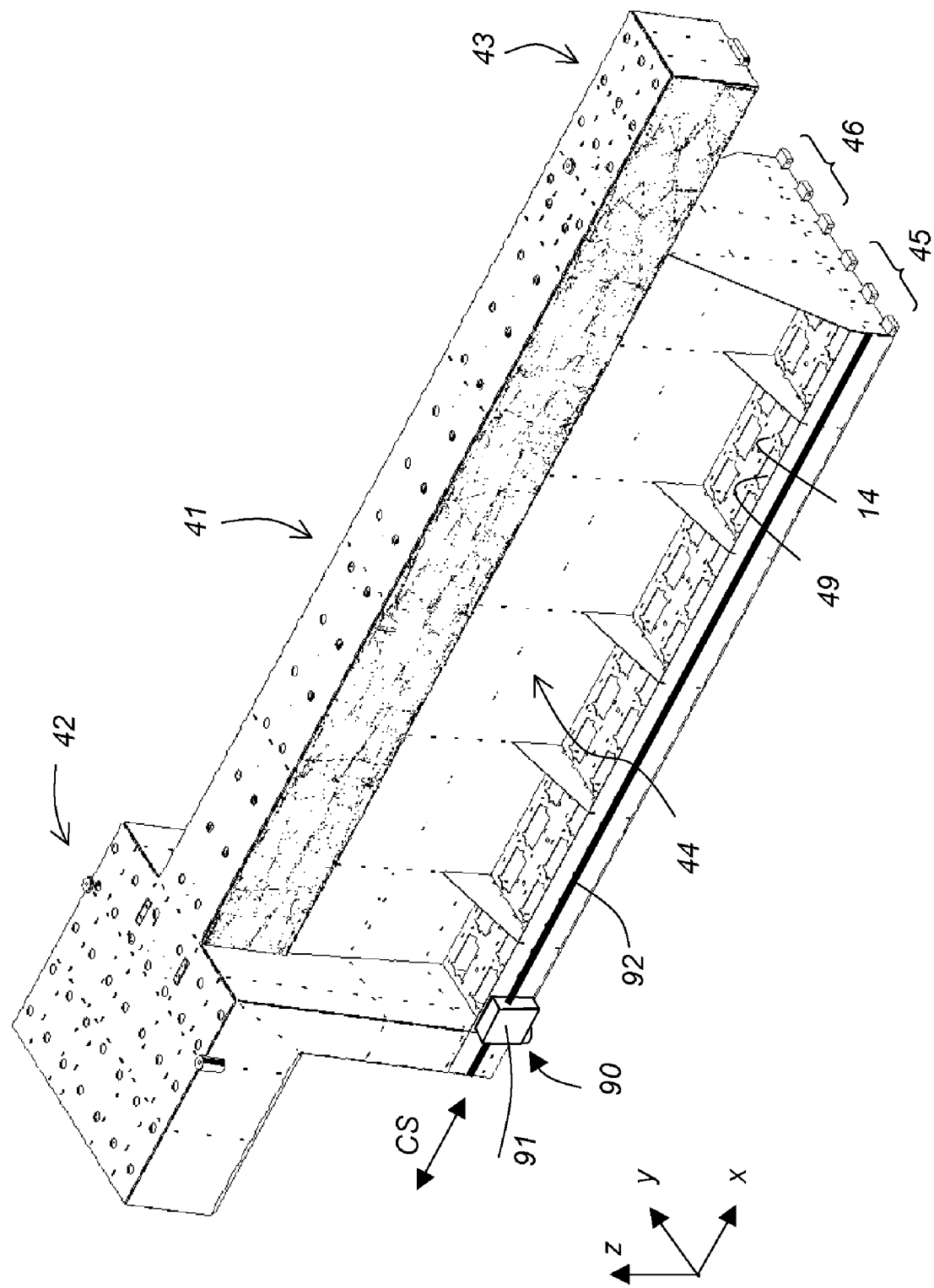
FIG. 2 shows a preferred embodiment of a print head shuttle for holding a multitude of print heads and a possible location for mounting a high resolution scanning device onto the print head shuttle.

As shown in FIG. 1, the print head shuttle in the present preferred embodiment of the digital printer is guided and supported by a support frame. Basically, the support frame preferably has a double beam construction that supports the print head shuttle at each end and along the full length of the fast scan movement. A print head shuttle that may be used in the digital printer of FIG. 1 is shown in FIG. 2. The print head shuttle 4 has a central bridge 41 between a left supporting end 42 and a right supporting end 43. A print head carriage 44 is suspended underneath the bridge 41. The print head carriage is divided into a front portion 45 and a rear portion 46. The carriage is provided with print head locations 49 for mounting a total of sixty-four print heads in a matrix of 4-by-16, i.e., four print heads behind each other in the fast scan direction or y-direction and sixteen print heads next to each other along the slow scan direction or x-direction. The sixty-four print head locations are equally spread over the front portion and rear portion of the carriage. The print head locations in the fast scan direction, i.e., the four locations in line, may be used to simultaneously print four colors in a single fast scan movement of the print head shuttle, e.g., print full process colors in one pass by simultaneously printing Cyan, Magenta, Yellow, and black colors. The sixteen print head locations next to each other along the slow scan direction allow the print head shuttle to span a substantial width of the printing table, preferably the full width of the printing table to allow printing sheets to be completely printed in only a few fast scan movements. The width of the print head carriage along the x-direction is about 2 m, for example. The depth along the y-direction of the print head carriage is about 0.5 m, for example.

Print Head Positioning

Figure 3:
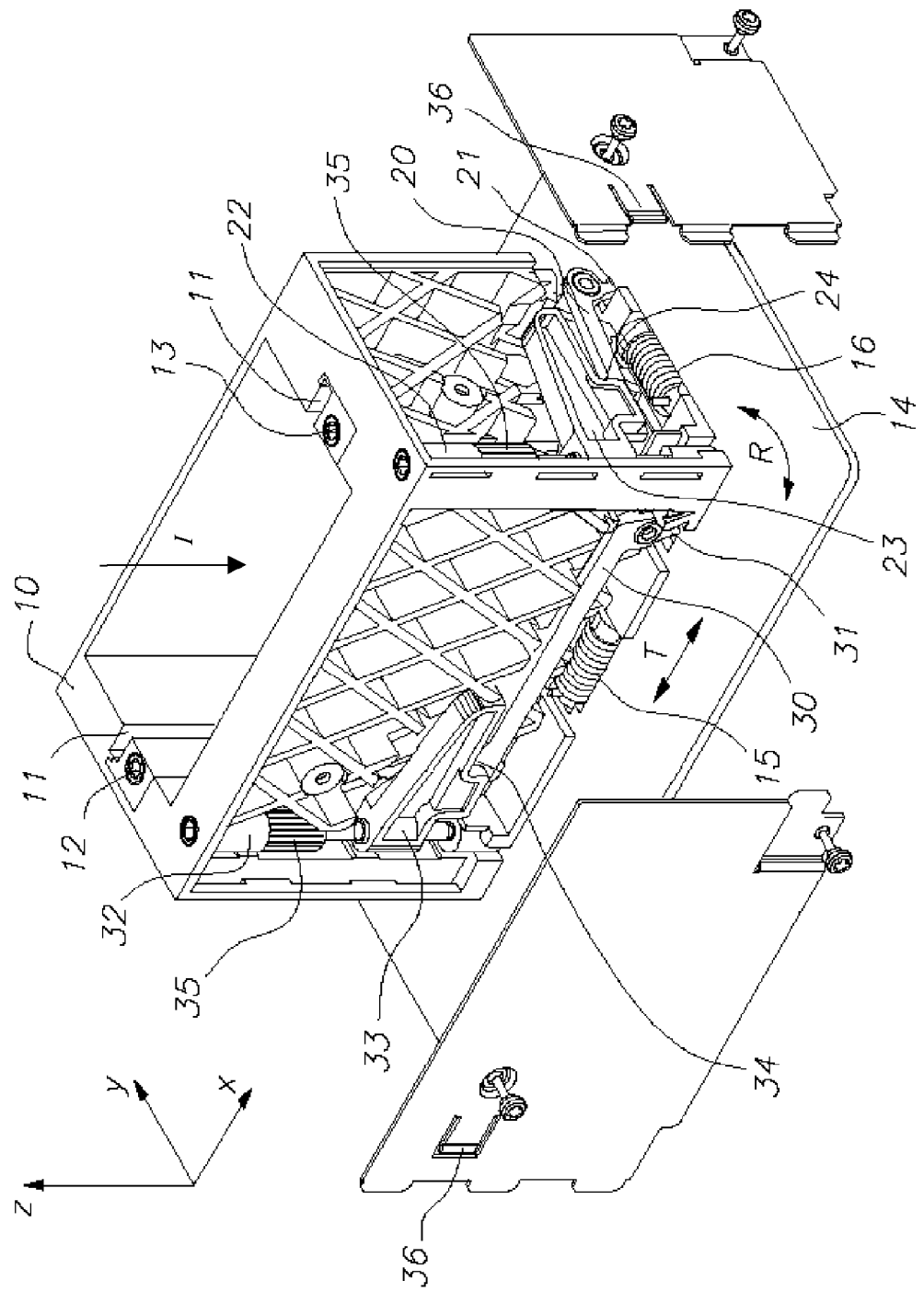
FIGS. 3 and 4 show a preferred embodiment of a print head positioning device that may be used to adjust the position of the print head.

Mounting and positioning of the print heads, in the x, y, and z-directions, at the sixty-four print head locations in the print head carriage may be achieved with the use of print head positioning devices 10 as described in EP 1 674 279, incorporated herein by reference. FIG. 3 is taken from this patent application. The print head positioning device will be further referred to as the 'HPD' (Head Positioning Device). The HPD uses print heads having a z-datum as a mechanical reference to define the print head's z-position relative to a mounting base. The print head is inserted in the HPD along the direction of arrow I and fixed in the Z-direction using splines fitting in the grooves 11. By tightening the screws 12 and 13, the associated splines move downward and push the print head's z-datum against a mounting base plate 14 which is part of the print head carriage and is common for all print heads. At the same time the print head moves into a fixed position in the HPD. The base plate has cutouts at the print head locations for passing through the front portion of the print head so that the printing elements of the print head extend through the base plate.

Figure 4:
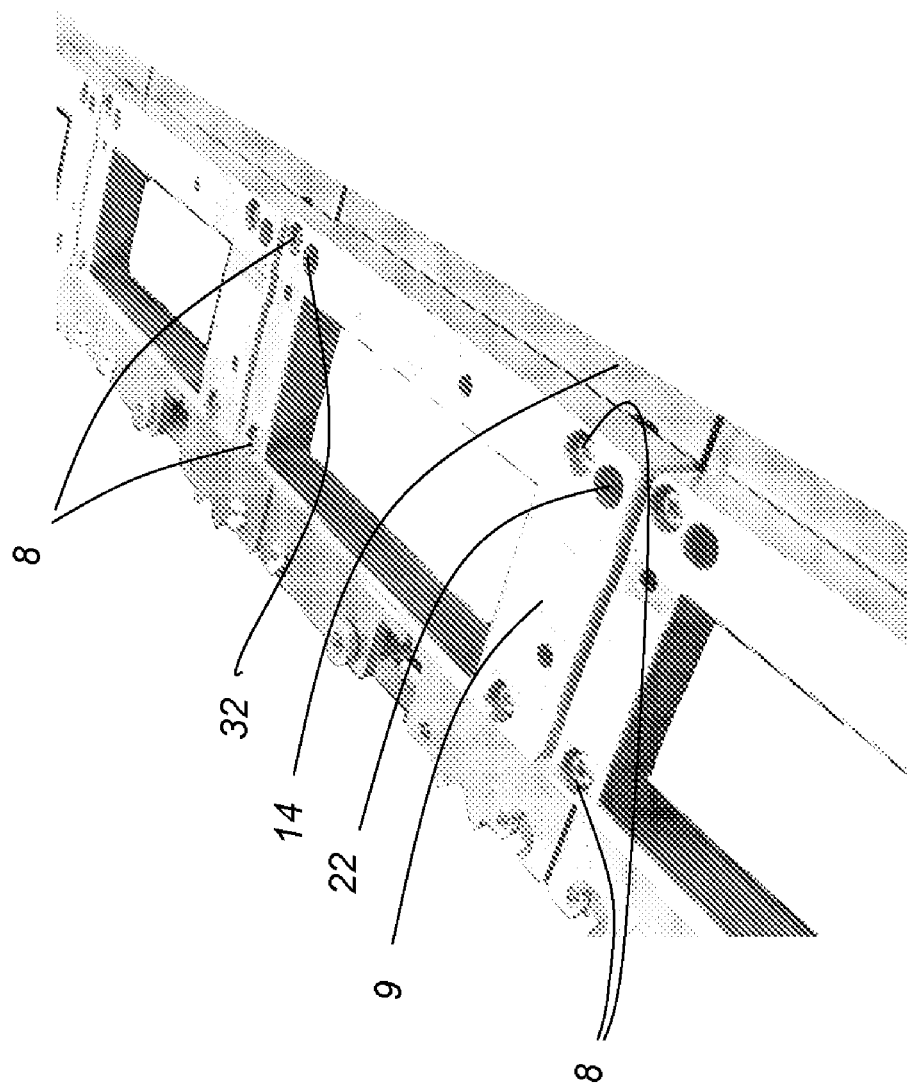

The HPDs are movably mounted on the base plate by slide blocks 9 (see FIG. 4), in a way that the base plate is sandwiched between the HPD and the slide block. The slide block pulls the HPD towards the base plate and is attached to the HPD using four spring-loaded screws 8. The spring-loaded screws control the friction force between the HPD and the base plate. The HPD may translate relatively to the base plate in the x-direction to align print heads in the print head carriage relative to each other, and may rotate in the xy-plane to position the array of printing elements of the print heads substantially perpendicular to the fast scan direction. The translation and rotation of the HPD, relative to the base plate, are indicated by the arrows T and R on FIG. 3. The translation of the HPD along the x-direction is achieved by adjustment screw 32 and lever system 30-31, acting upon a datum in the base plate and against anti-play spring 15. The rotation of the HP in the xy-plane is performed by adjustment screw 22 and lever system 20-21, acting upon another datum in the base plate and against anti-play spring 16. The adjustment screws may be operable from the back of the HPD, i.e., the side used to insert the print head in the HPD, and from the front of the slide block, i.e., the side where the printing elements are located.

Calibration Process

The alignment and calibration process for the sixty-four print heads, in a preferred embodiment of the print head shuttle as shown in FIG. 2, is extensive, tedious, work and needs to be executed with great care. A preferred method is disclosed to fully automate this alignment and calibration process. Within the scope of the present invention, "calibration" is the process of determining the performance of a printing system by comparing one or more print quality parameters with predefined specifications. A calibration process may include "adjustments" to the printing system, either manually or automatically, to direct its performance towards the predefined specification. Adjustments that are often used in a calibration process to enhance printing system performance are print head position adjustments or print head alignment.

Calscan

In digital printing technology, the digitally printed image is composed of individual pixels that are printed by the printing elements of a print head. A print head may include a number of printing elements. They may be physically arranged in a pattern, e.g., an array of nozzles. During printing, the array of printing elements prints corresponding arrays of dots on the printing medium. In the preferred embodiment of the digital printer described above, sixty-four arrays of printing elements can print sixty-four corresponding arrays of dots simultaneously.

Part of the calibration process of the digital printer is measuring the position of each of the arrays of printing elements (print heads) relative to each other. The relative position of the arrays of printing elements may be determined by measuring the relative position of dots printed by these arrays, on a printing medium. In a preferred embodiment of the present invention, an in-situ high resolution scanner system 90, further referred to as "calscan", is provided to measure the position of printed dots. The calscan includes a high resolution reflection camera 91 for retrieving small size, high resolution image frames of a printed test pattern, a linear motion mechanism 92 that can position the high resolution camera along a scan direction CS and deliver linear position information of the camera and link this information to the image frames retrieved by the camera as a kind of position tag, and image analysis software for calculating dot positions. In a specific preferred embodiment, the camera may have a 5 µm optical resolution for scanning printed dots having a dot size of about 30 µm or more and for calculating a center of gravity of these dots with a 1 pm accuracy, a minimum focal depth of 400 pm (±200 µm to a reference), and a minimum optical scan length or field of view of 4 mm, for example. The camera is specified with a required optical resolution, rather than an absolute accuracy, because in the calibration process the position of the dots relative to each other is more relevant than the absolute dot position. The calscan camera may be fitted with a telecentric lens that does not require a fixed focus distance and therefore delivers undistorted images of printed pixels on printing media with slightly varying media flatness (e.g., as a result of media cockling, inherent unflatness of plastic board or cardboards media, etc.).

Figure 5A:
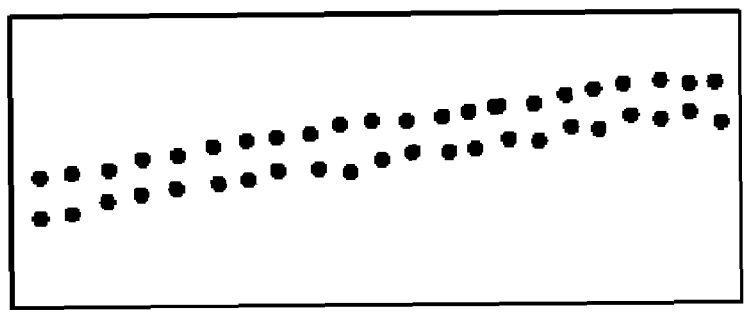
FIGS. 5A to 5E show an example of composing a larger image from smaller frames captured by a camera with a limited field of view.
Figure 5B:
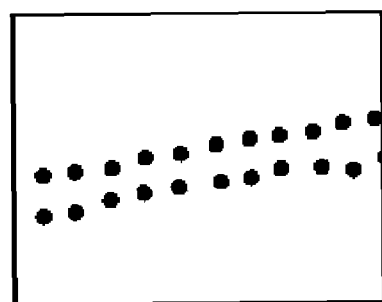
Figure 5C:
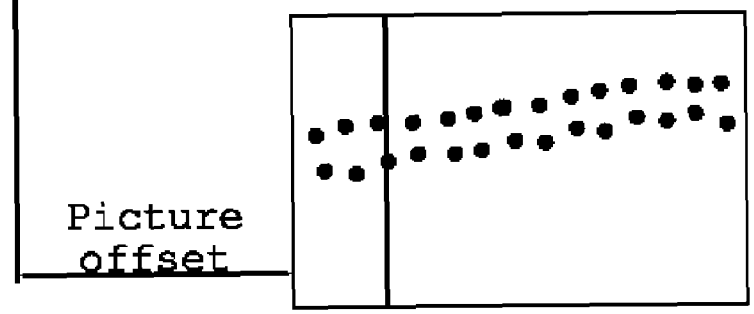
Figure 5D:
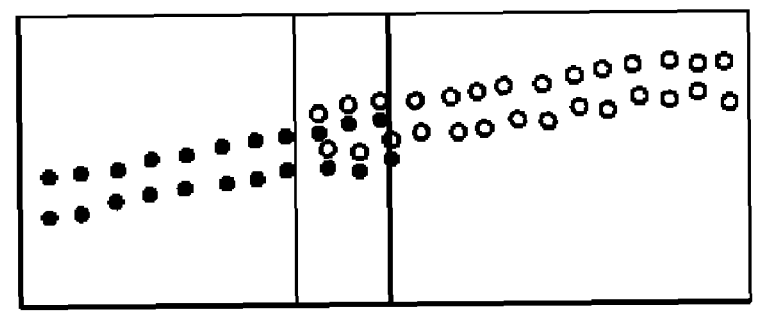
Figure 5E:
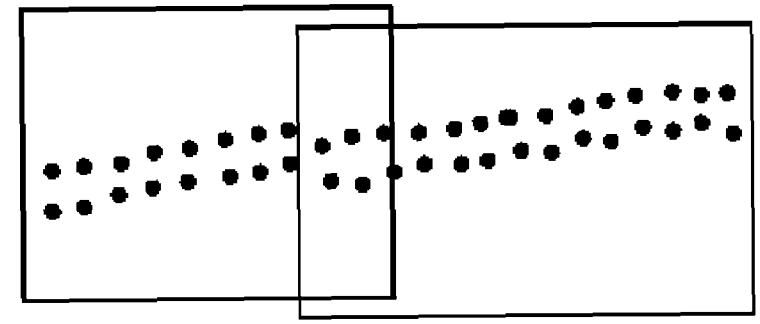

With reference to FIG. 2, the calscan module having a limited field of view may be mounted onto a high precision linear motion system 92. The precision linear motion system is for moving the high resolution scanner in scan direction CS parallel with the x-direction or slow scan direction, across a printed test pattern. The calscan linear motion system itself may be mounted on the print head shuttle, the fast scan drive of the print head shuttle thereby providing additional repositioning of the calscan relative to a printed test pattern in the fast scan direction. Preferably an encoder feedback from the calscan linear motion system is provided. The encoder feedback allows the small size image frames retrieved by the camera to be linked to position information. Using this position information, a large image of the printed test pattern (possibly even to a full width image) may be composed from small size image frames. The composition of the larger images may be performed by software, with equivalent firmware or dedicated hardware implementations. The small size image frames may have some overlap, e.g., a number of dots, which eases the process of composing the larger size image. This overlap may cut down on the specifications for the calscan linear motion system, while the additional work that is to be performed by the composition tool is limited. The fast scan motion system (i.e., the print head shuttle drive) already is a precise positioning system. An example of the image composition process is illustrated in FIGS. 5A to 5E. FIG. 5A shows an example of an area of a printed test pattern that is to be used in the calibration. The field of view of the camera is smaller than this area. FIGS. 5B and 5C show the small size image frames taken by the camera at different xy-locations of the calscan. These locations are provided by the encoder feedback of the fast scan and calscan linear motion systems. After an xy-offset correction based on encoder feedback data, tolerances in the linear motion systems may still cause the small size image frames not to match when pieced together (see FIG. 5D). An overlap area in the small size image frames assures that a portion of the printed information will be found in multiple frames. By defining the best match for the printed information in the overlap area of the frames, a real xy-offset between the two frames can be found (see FIG. 5E). In the example it is assumed that the calscan linear motion system does not introduce a rotation of the image frames. But this may be compensated for also, if needed.

Calibration Correction

A specific preferred embodiment of a calibration process described hereinafter includes the calibration of a bidirectional printing process, where printing is performed during the forward and backward fast scan movement of the print head shuttle. Bidirectional printing, compared to unidirectional printing, imposes additional constraints on print head positioning onto the shuttle and timing of the printing element's activation during printing, as will be clear from the description hereinafter. The calibration process may include the following steps.

1. Correction of the Print Head's Non-perpendicularity

This step assures that a line printed from an array of printing elements (shown as array 52 in FIG. 6A) is always perpendicular to the fast scan direction. The perpendicularity may be adjusted with adjustment screw 22 of the HPD head positioning device (see above). In a first fast scan movement, a group of printing elements 53 at one end of an array of printing elements of a print head print a line A1. The print head is now moved along the slow scan or x-direction. In a subsequent fast scan movement a group of printing elements 54 at the other end of the array of printing elements print a line A2 at a specified y-offset d (see the illustration in FIG. 6A). The length of the printed lines and the distance between the printed lines should be smaller than the field of view of the calscan camera. A printed result may look like the illustration in FIG. 6B. The center of gravity CoG1 and CoG2 of printed lines A1 and A2, respectively, is calculated. The distance between these centers of gravity for a perfectly aligned print head should equal the y-offset d. The difference Δd is a measure for the misalignment from perfect perpendicularity of the print head over a distance n. The non-perpendicularity is defined as an angle a derived from the formula tan α=Δd/n. A non-perpendicularity of the print head may be corrected using adjustment screw 22 of the HPD.

Figure 6A:
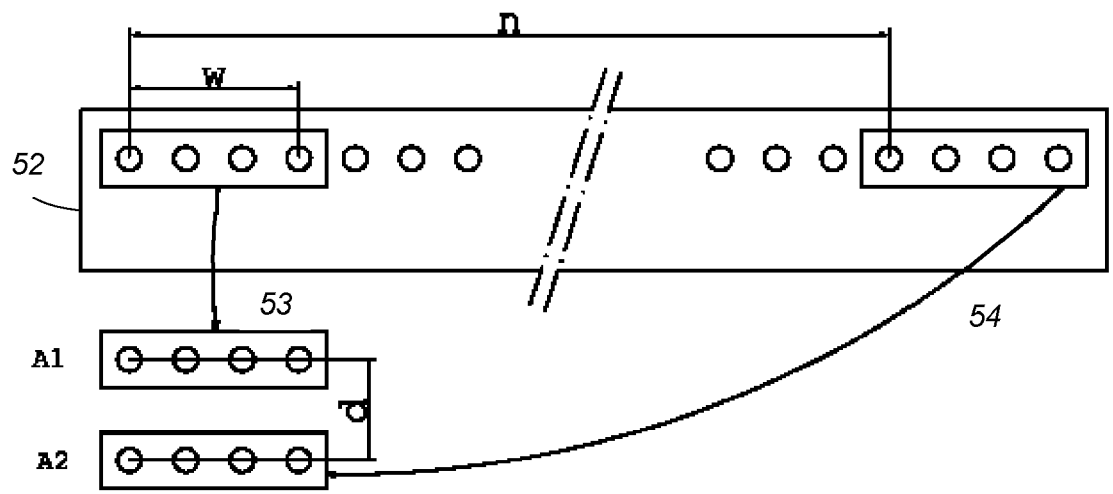
FIGS. 6A to 6D show multiple preferred embodiments of an array of printing elements and associated test pattern to calibrate non-perpendicularity of the array of printing elements to the printing direction.
Figure 6B:
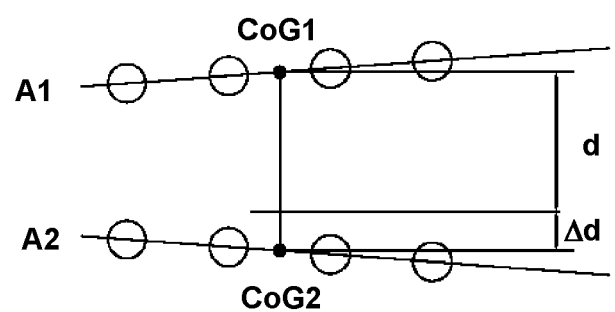

The group of printing elements used for printing line A1 and respectively line A2 do not have to be located exactly at the opposite far ends of the array of printing elements, as shown in FIG. 6A. The calibration method works as well with groups of printing elements located near the opposite far ends of the array of printing elements, although in general the accuracy of the calculations described above will decrease if the groups of printing elements used are located closer to each other. A reason for not using the far end printing elements in the array of printing elements may be that some of these printing elements are not operational (e.g., in a specific printing mode) or that these printing elements show a side effect linked to their outmost position (e.g., a recurring dot placement error because they are edge elements).

Figure 6C:
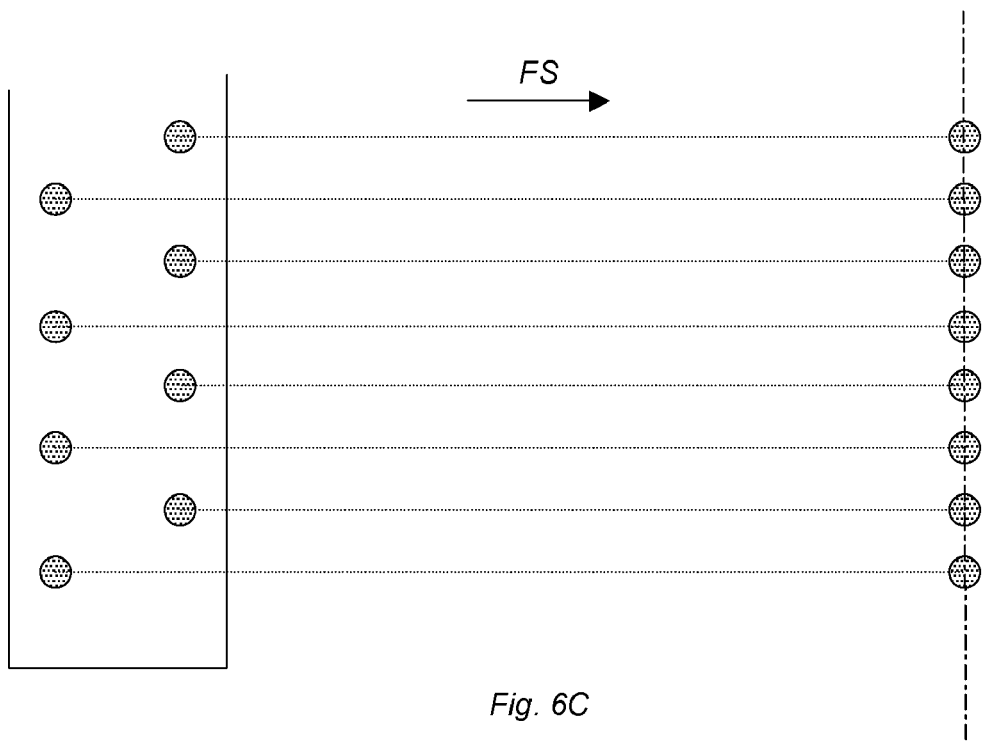
Figure 6D:
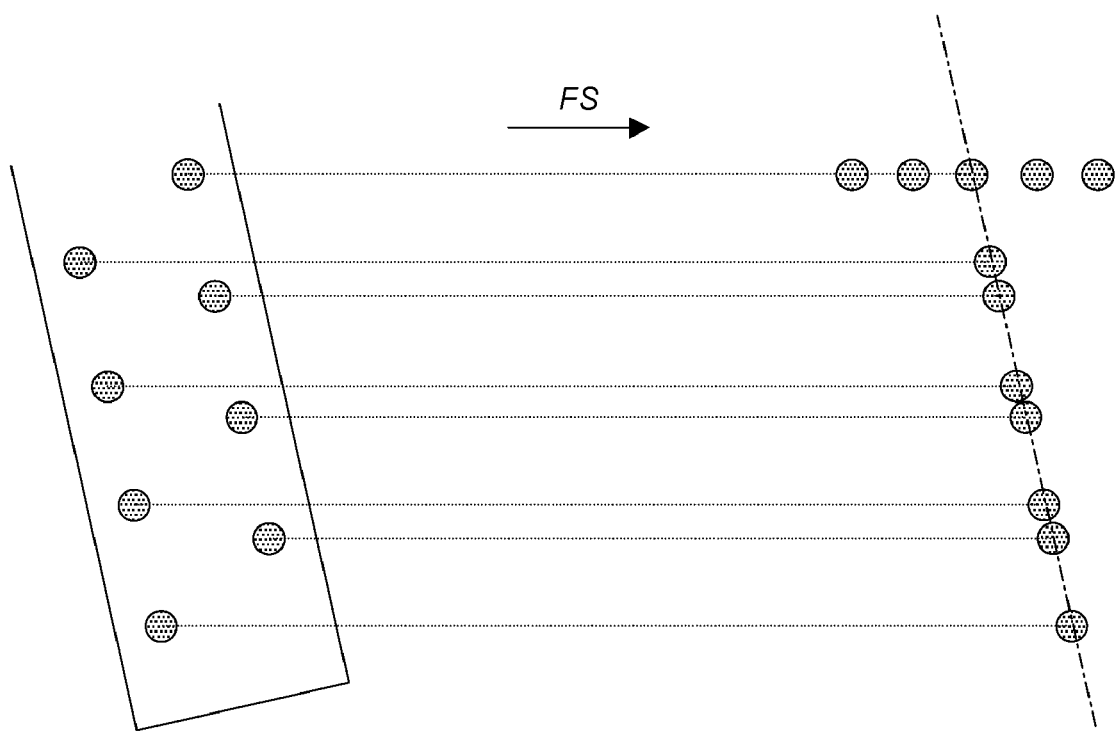

If the array of printing elements of the print head to be aligned perpendicular to the fast scan direction includes multiple rows of printing elements, whereby these rows are interlaced in the fast scan direction, another test pattern may be used to calculate and/or verify the perpendicular alignment of the print head. This is illustrated in FIG. 6C which shows the printed dots (right side of the figure) of an array of interlaced printing elements (left side of the figure). With the correct timing for ejecting drops from the first row of printing elements relative to the timing for the second row of printing elements, and with a perpendicularly aligned print head, the printed dots on the receiver medium are interlaced in one row and at equidistant positions from each other (FIG. 6C). When the print head is not aligned perpendicular to the fast scan direction FS, the ejected drops do not land at equidistant positions from each other and the printed line is not perpendicular to the fast scan direction (see FIG. 6D). The fast scan direction may be shown on the printed test target by a sequence of successively printed dots by a single printing element. Both aspects may be visually verified very easily.

The non-perpendicularity of the print head is a calibration or alignment of the print head to the fast scan direction and not to other print heads.

2. Aligning in x- and y-directions

Figure 7:
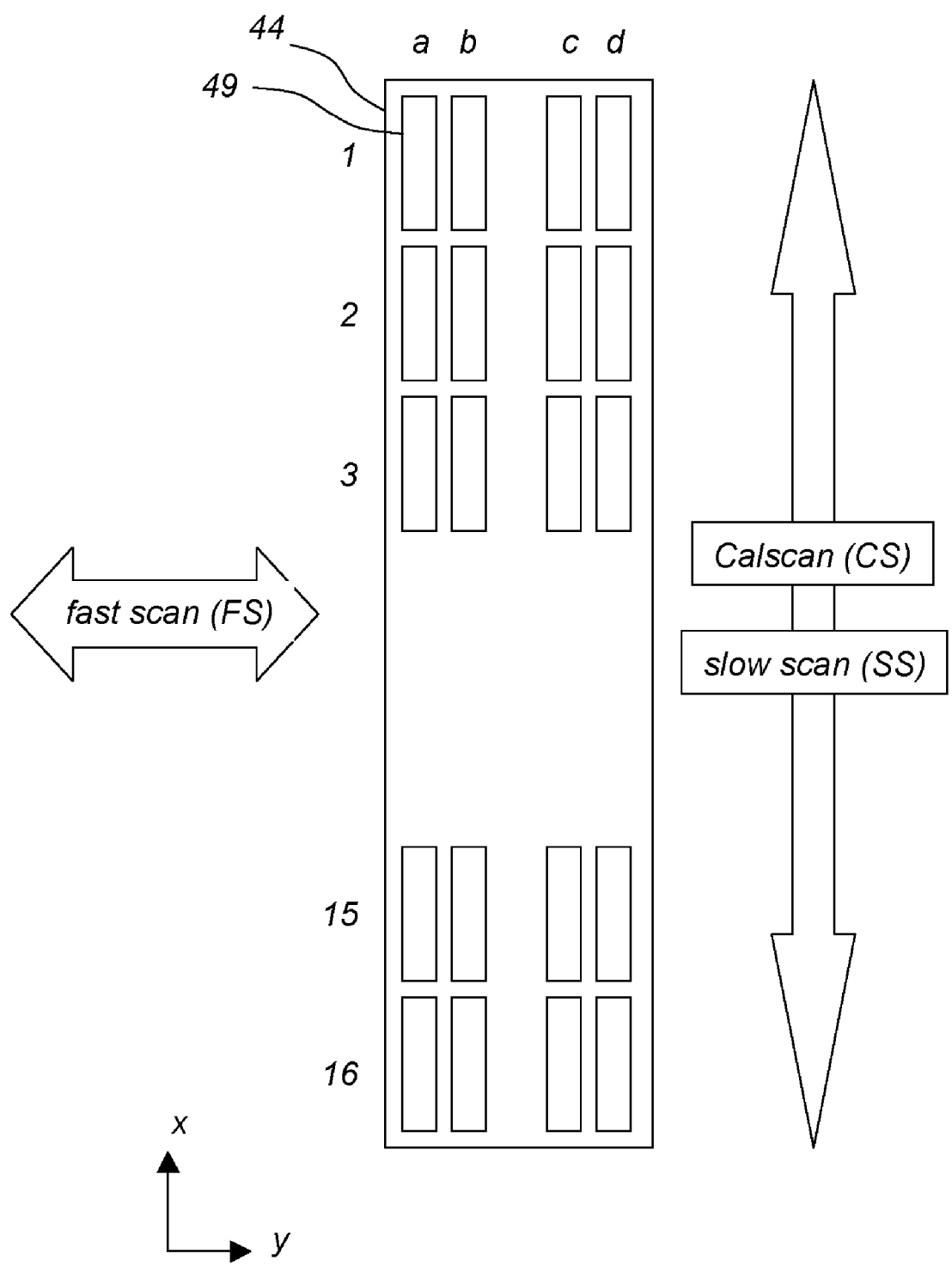
FIG. 7 shows a print head shuttle setup with print heads positioned in a matrix configuration to illustrate the definitions of rows and columns, and the direction of movements.

A second step may include the aligning of the print heads in x- and y-direction, relative to each other. In the x-direction the print head's position may be adjusted with the adjustment screw 32 of the HPD. In the y-direction the position of the print heads is virtually adjusted via a software offset (time or position related) for the activation of the corresponding array of printing elements. In FIG. 7 a schematic drawing is shown of a print head carriage 44 as shown in FIG. 2 with sixty-four print head locations 49 arranged in sixteen rows (1 to 16) by four columns (a to d). Each print head location may be fitted with a print head positioning device and may have mounted therein a print head having an array of printing elements.

Figure 8A:
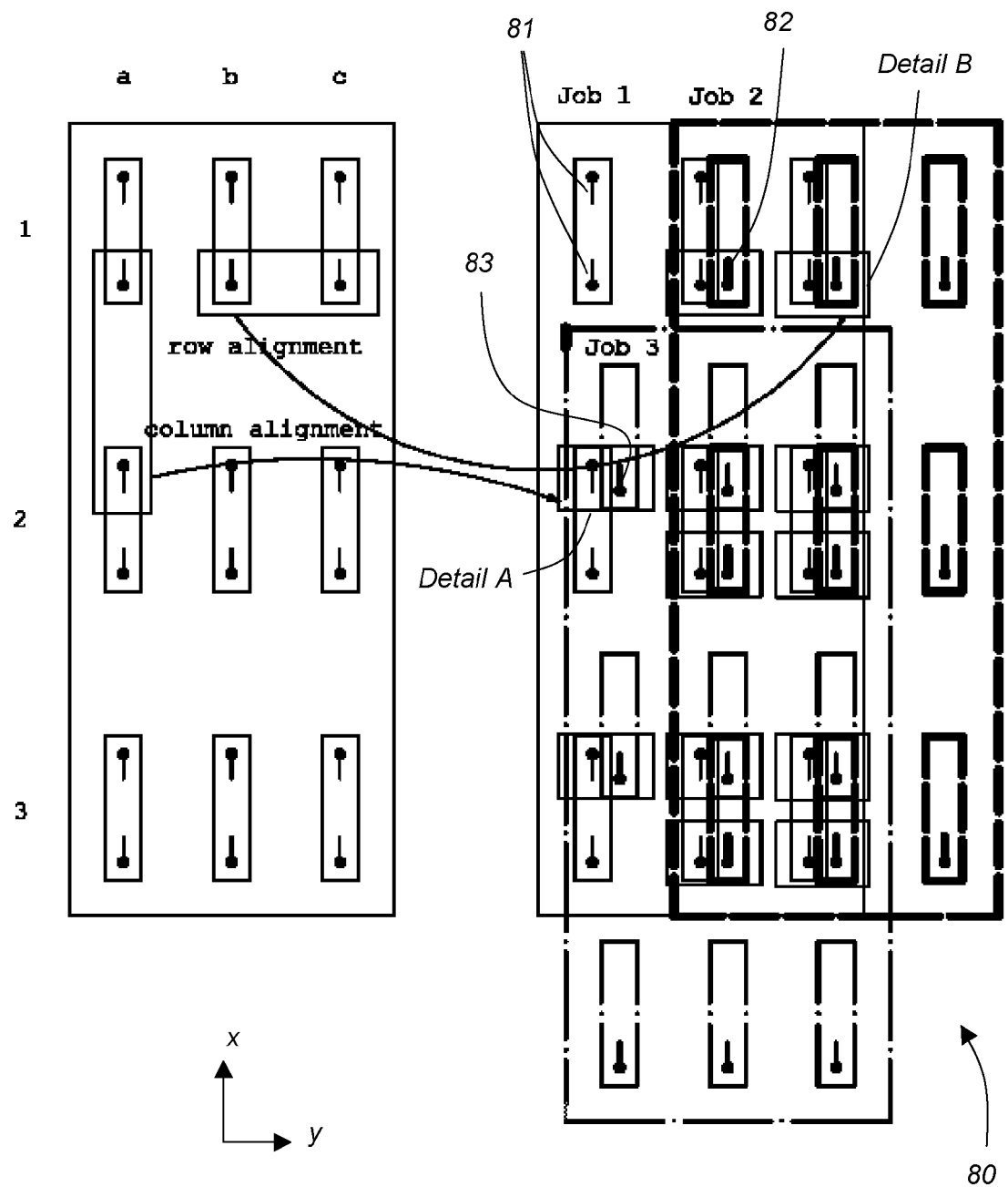
FIG. 8A shows a preferred embodiment of a calibration test pattern for a print head shuttle setup with nine print heads in a 3-by-3 configuration.

For the calibration of print head alignment, a test pattern 80 may be used as shown in FIG. 8A. At the left side of FIG. 8A, a reduced 3-by-3 representation of the 16-by-4 print head configuration of FIG. 7 is shown; at the right side of FIG. 8A, the calibration test pattern is shown. The test pattern combines three printouts, indicated as job 1 through job 3 and printed in three separate fast scans of the print head shuttle. Referring to FIG. 8A, job 1 (solid line) prints two lines 81 with each print head, the two lines printed with printing elements located at the opposite ends of the array of printing elements of the print head. Job 2 (dashed line) prints only one line 82 with printing elements at one end of the array of printing elements of each print head, but with an y-offset (from the printout of job 1) related to the distance between two rows of print heads in the y-direction, and increased with a small delta "fsOffs" in the y-direction. The small delta is required to distinguish the printout of job 2 from that of job 1. Without the delta and with perfectly aligned print heads, the lines printed in job 2 would coincide with some of the lines printed in job 1. Finally, job 3 (axis line) prints one line 83 with the same printing elements as used in job 2 but with an offset (from the printout of job 1) related to the distance between two columns of print heads in the x-direction, increased with a small delta "fsOffs" in the y-direction.

Figure 8B:
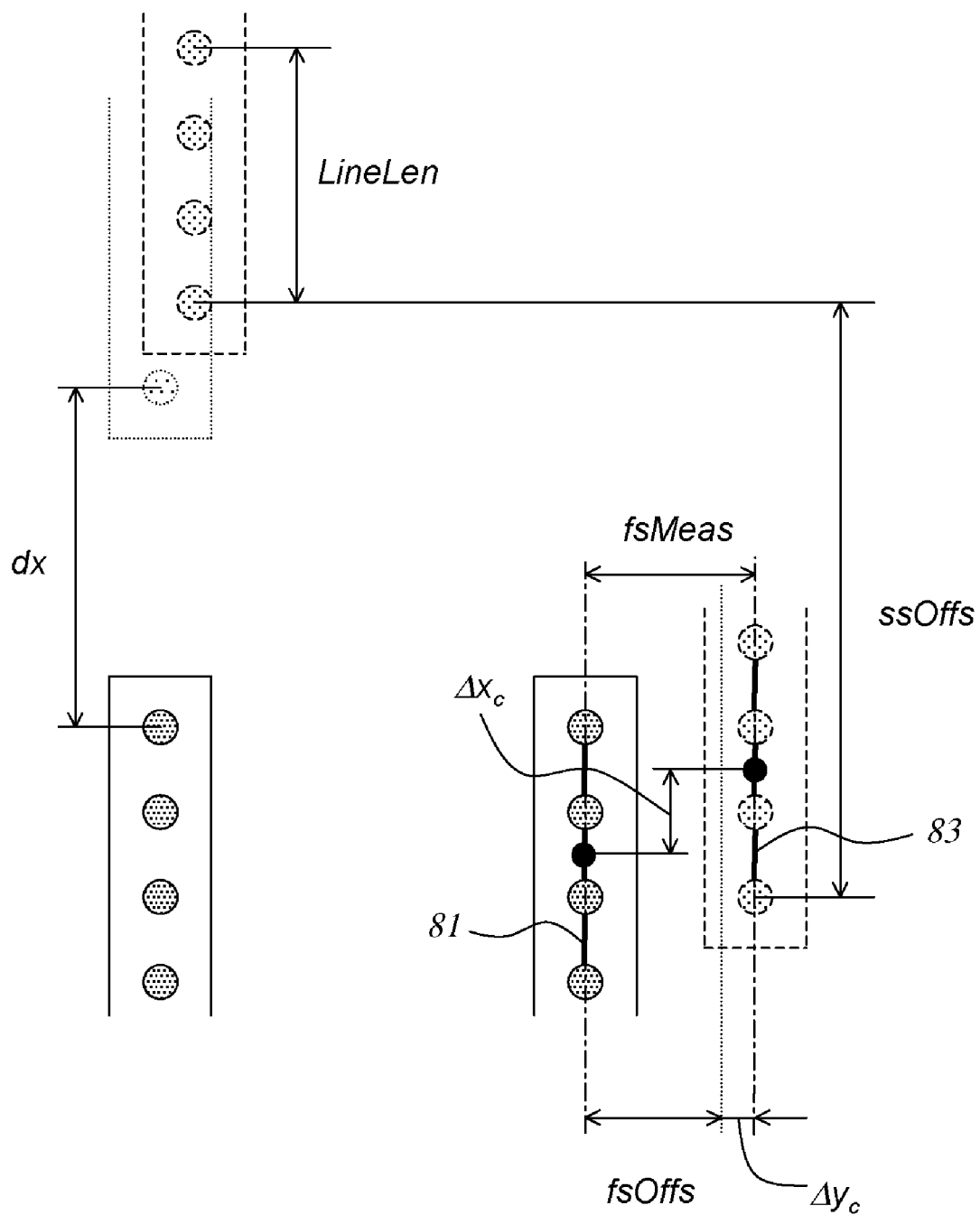
FIGS. 8B and 8C show details of adjacent print heads or arrays of printing elements and test patterns to calibrate the alignment of the print heads or arrays of printing elements relative to each other in the x and y direction.

At first, the print heads in a column may be aligned using the printed test patterns from job 1 (lines 81) and job 3 (lines 83). The alignment process starts with a first pair of print heads near the center of the print head configuration on the print head shuttle. This reduces cumulative errors when adding print heads to the alignment process. So a first pair of adjacent print heads, near the center of the print head configuration and within one column, is selected. At the left side of FIG. 8B the print head positions are shown, while at the right side of FIG. 8B the printed test pattern is shown, which corresponds to detail A of FIG. 8A. Referring to the left side of FIG. 8B, the position of the first print head is outlined with solid lines and the position of the second print head is outlined with dashed lines, whereas the dotted line shows the target position of the second print head in an aligned position with the first print head. Between the printing of job 1 (lines 81) and job 3 (line 83), the print head shuttle is given a specific xy-offset. The print head shuttle is given an x-offset referred to as "ssOffs" to get printed test patterns from neighboring print heads within the field of view of the calscan camera, and a small y-offset referred to as "fsOffs" to prevent the printed test patterns from overlapping. The term ssOffs may be defined as the sum of the distance between the outer printing elements of neighboring print heads (dx) and the length of the printed lines in the test pattern (LineLen), so that the offset brings both lines 81 and 83 at the same x-coordinate. The calscan takes an image of the dots defining lines 81 and 83 (see FIG. 8B), calculates the centers of gravity of these lines, and the resulting calibration value $\Delta_c$ defined as the difference between the x-coordinates of the centers of gravity of both printed lines, may then be used to correct the x-position of the second print head relative to the first print head. The calibration value $\Delta y_c$ defined as the difference fsMeas between the y-coordinates of the centers of gravity of both printed lines minus the preset value fsOffs, may be used to correct the y-position of the second print head relative to the first print head. This procedure may be continued with the addition of print heads forming pairs with already aligned print heads in the column, until all the print heads in the column are aligned with each other.

Figure 8C:
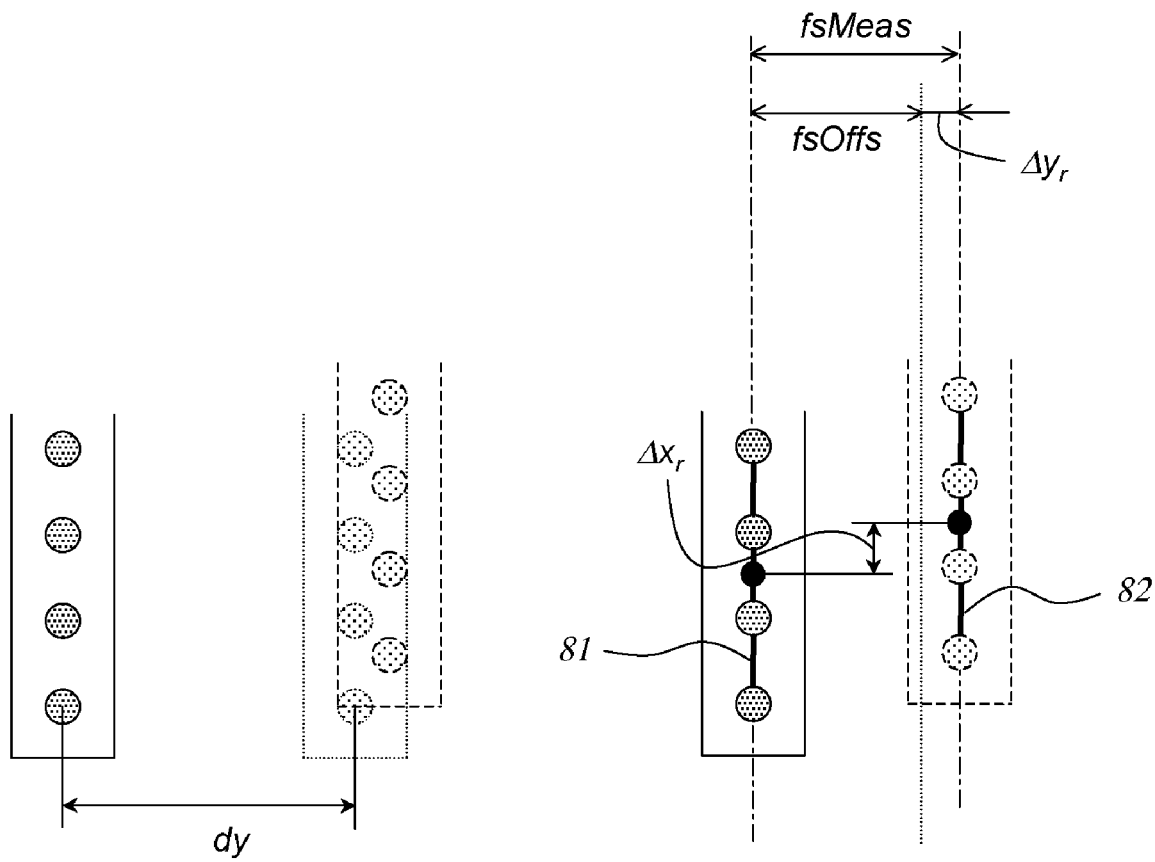

Secondly, for each row, the print heads in the row are aligned with the one row-reference print head in the row that already has been aligned during the column alignment procedure just described. Row alignment may be based on printed test patterns from job 1 (lines 81) and job 2 (lines 82). If the position of the row-reference print heads has been adjusted, a new test pattern may be printed providing actual position information of print heads in a row relative to an already aligned row-reference print head in that row. If the position of the row-reference print heads has not been adjusted after the column alignment process, a new printed test pattern would not incorporate the effect of the calculated column alignment position adjustment values $\Delta x_c$ and $\Delta y_c$ and therefore the calculations in the hereinafter discussed row alignment must take into account that the position of the row-reference print head has not yet been adjusted. Reference is now made to FIG. 8C. A first line 81 from the row-reference print head is printed in job 1 and a second line 82 from a neighboring print head still to be aligned is printed in job 2. Between the printing of job 1 and job 2, the print head shuttle is given a specific y-offset. The print head shuttle is given an offset dy to get the printed lines from neighboring print heads in the row within the field of view of the calscan camera, and an additional small y-offset referred to as fsOffs to prevent the printed lines from overlapping. The offset dy may be defined as the distance between the arrays of printing elements of neighboring print heads in the row. The calscan takes an image of the dots defining lines 81 and 82 (see FIG. 8C), calculates the centers of gravity of these lines, and the resulting calibration value $\Delta x_r$, defined as the difference between the x-coordinates of the centers of gravity of both printed lines, may be used to correct the x-position of the print head to be aligned. The calibration value $\Delta y_r$, defined as the difference fsMeas between the y-coordinates of the centers of gravity of both printed lines minus the preset value fsOffs, may be used to correct the y-position of the print head to be aligned. This procedure may be continued with other print heads in the row, pairing up with an already aligned neighboring print head, until all print heads in that row are aligned. The row alignment is continued for all rows in the print head configuration.

3. Bidirectional Offset

A third step in the calibration process may include defining the bidirectional printing offset. This parameter reflects the offset between lines printed at the same fast scan position but during opposite fast scans of the print head shuttle. In bidirectional printing mode, i.e., a mode wherein printing is performed during the forward and backward fast scan of the print head shuttle, a drop that is printed by a printing element at a specific print position, i.e., at a specific fast scan position of the print head shuttle, will land at different locations on the printing medium depending on the direction of the fast scan motion and the fast scan speed. Nonetheless, dots printed during a forward fast scan and a backward fast scan may be part of a single image and therefore need to be aligned with each other to create a single image reproduction. This is achieved by providing a calibration step wherein an offset from the print position is calculated for every fast scan direction and fast scan speed in order to get the printed dots landing on the printing medium where they are supposed to land.

Figure 9:
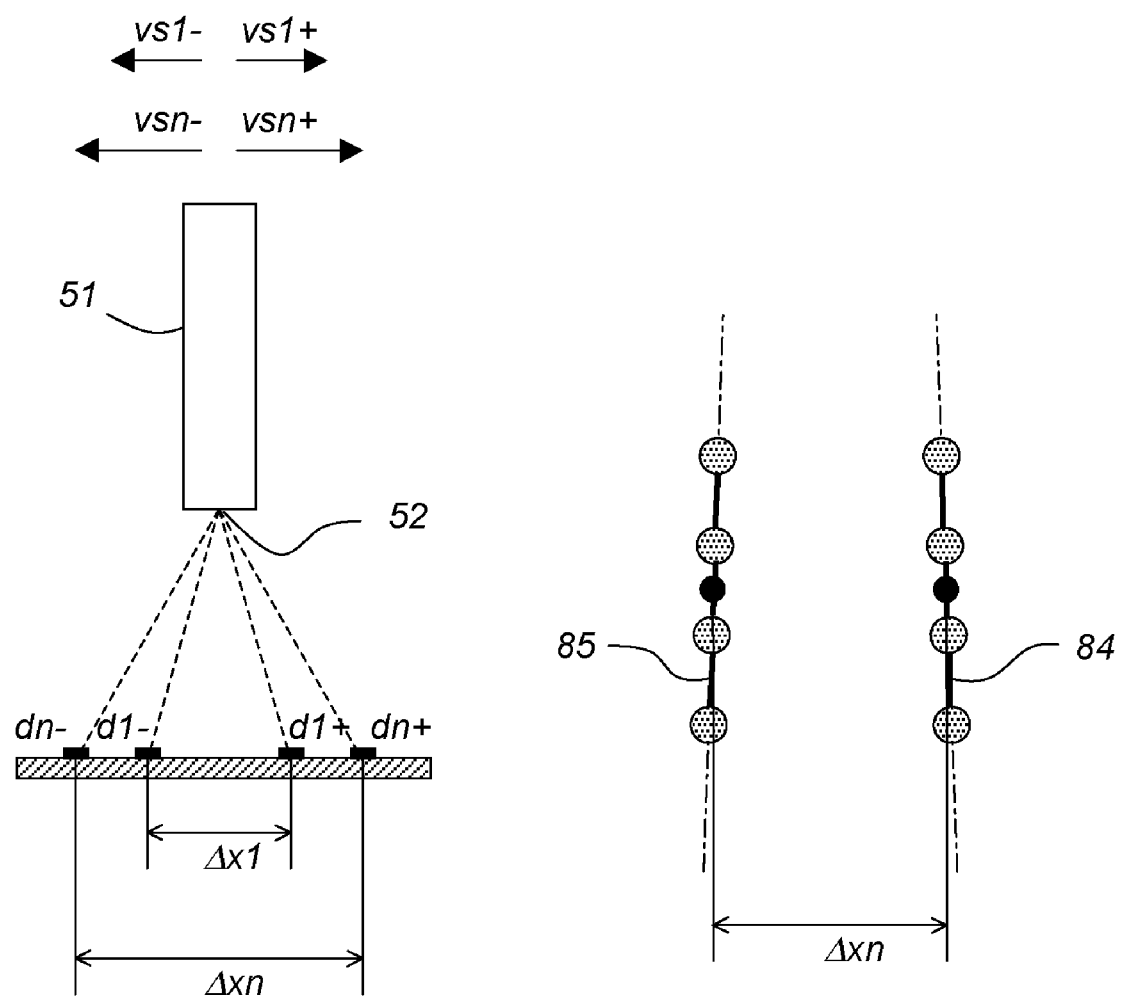
FIG. 9 shows the calibration of the printing of dots from a print head or array of printing elements when printing in a bidirectional printing mode and/or at different printing velocities.

Referring to the left side of FIG. 9, a print head 51 with an array of printing elements 52 moves forward (positive scan velocity vs1+) and backward (negative scan velocity vs1−) along a fast scan direction. Relative to the position of drop ejection, i.e., the print position, drops ejected during a forward fast scan from that location will land on position d1+ and drops ejected during a backward fast scan will land on position d1−. The distance $\Delta x1$ along the fast scan direction between the locations of dots at positions d1+ and d1− is a calibration value for the bidirectional offset at a fast scan velocity vs1. In practice, calibration values $\Delta xn$ at corresponding fast scan velocities vsn are measured by printing a line 84 in the forward fast scan direction at the given fast scan velocity and a line 85 in the backward fast scan direction at the given fast scan speed, both from the same print position, i.e., the location of the print head shuttle. As in previously described procedures, the calscan takes an image of the dots defining the lines 84 and 85, calculates the centers of gravity of these lines, and the resulting calibration value $\Delta xn$, defined as the difference between the y-coordinates of the centers of gravity of both printed lines, may then be used to correct for a bidirectional offset at the given fast scan speed. The procedure may be repeated for every fast scan speed used in the printer. A preferred embodiment describing how the bidirectional offset calibration values are used in a correction scheme during printing is described below.

4. Throw Distance Variations

A fourth step in the calibration procedure may include the calibration and compensation for throw distance variations. The throw distance is the perpendicular distance between the ejection point of drops from a printing element of a print head and the printing surface of a printing medium.

Figure 10A:
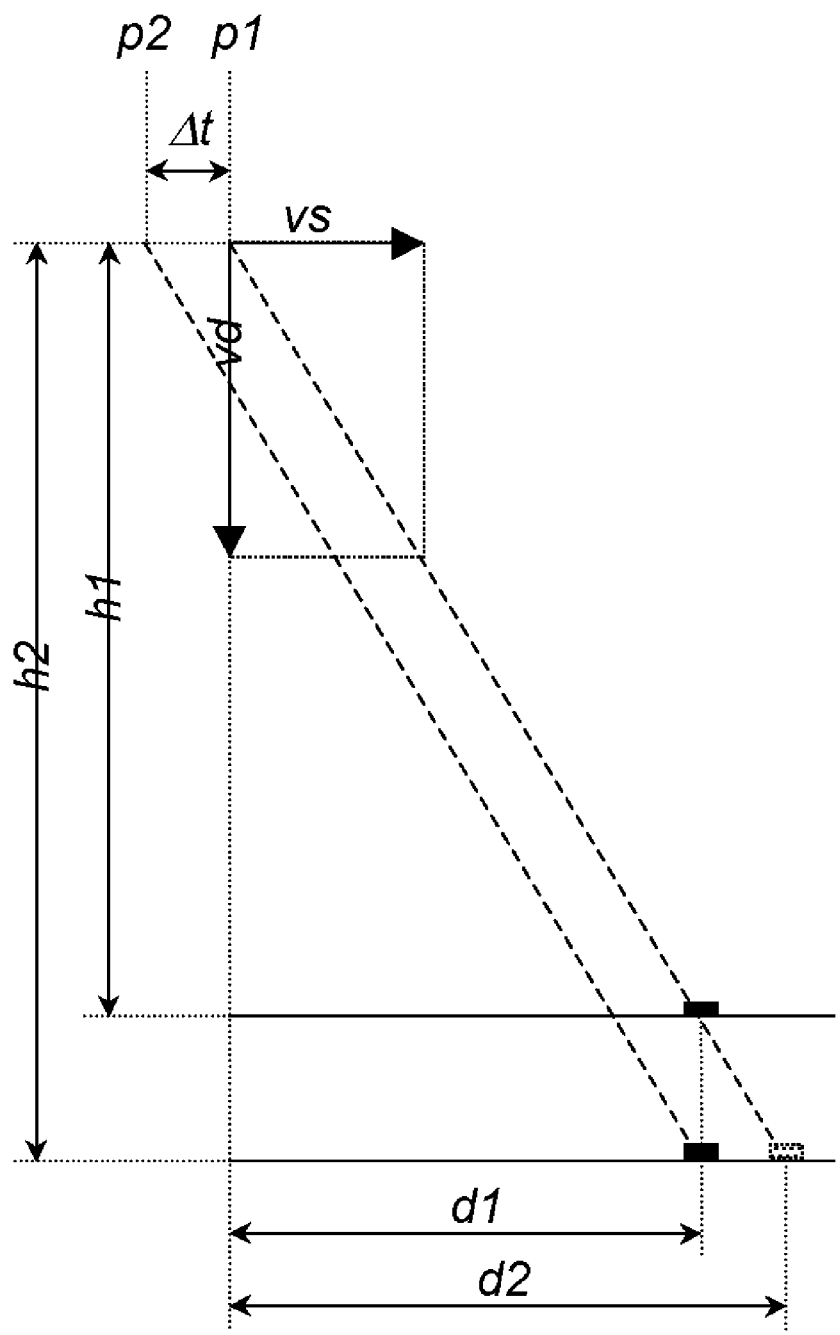
FIG. 10A shows the calibration of the printing of dots from a print head or array of printing elements when printing at different throw-distances and FIG. 10B shows adding bidirectional printing to a varying throw-distance.

Reference is now made to FIG. 10A. When drops are ejected from a printing element of a print head at print position p1, they have a velocity vector that is a combination of drop velocity vd and fast scan velocity vs. Assuming a linear drop trajectory, the drop will fly longer and further from its ejection point when the throw distance is larger (h2>h1). Given a fast scan velocity vs, a drop velocity vd, and a throw distance h1, the drop will land at a distance d1 from the print position p1 where the drop was ejected. Assuming a constant drop velocity vd but a different throw distance h2, the drop will land at a distance d2 from the drop ejection point p1. Changing the print position to p2, in the event that the throw distance is changed to h2, assures that the drop will land on its target position i.e., at a distance d1 from its print position p1.

Figure 10B:
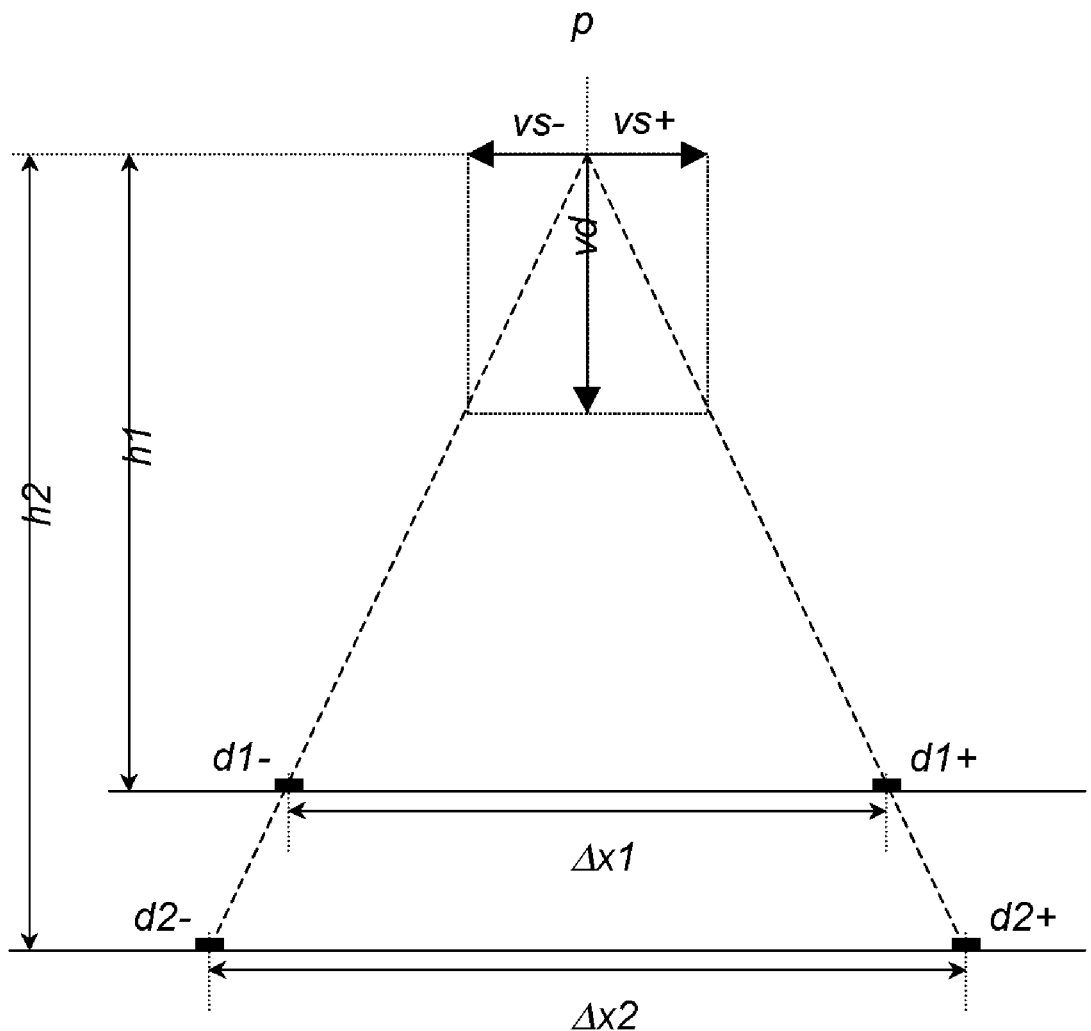

The throw distance can be measured by printing lines, similar to the test pattern shown in FIG. 9, during a forward and a backward fast scan, with identical fast scan velocity and at identical print positions (see FIG. 10B). Given a print position p and a throw distance h1, ejected drops will land at position d1+ (making up a first line) when ejected with a positive fast scan velocity vs+. Similarly ejected drops will land at position d1− (making up a second line) when ejected with a negative fast scan velocity vs−. Both lines are printed at a distance Δx1 from each other. The distance between the lines will be Δx2 for a throw distance h2. The difference between Δx1 and Δx2 is a measure for a difference in throw distance between h1 to h2.

5. Spatial Fire Correction

Figure 11:
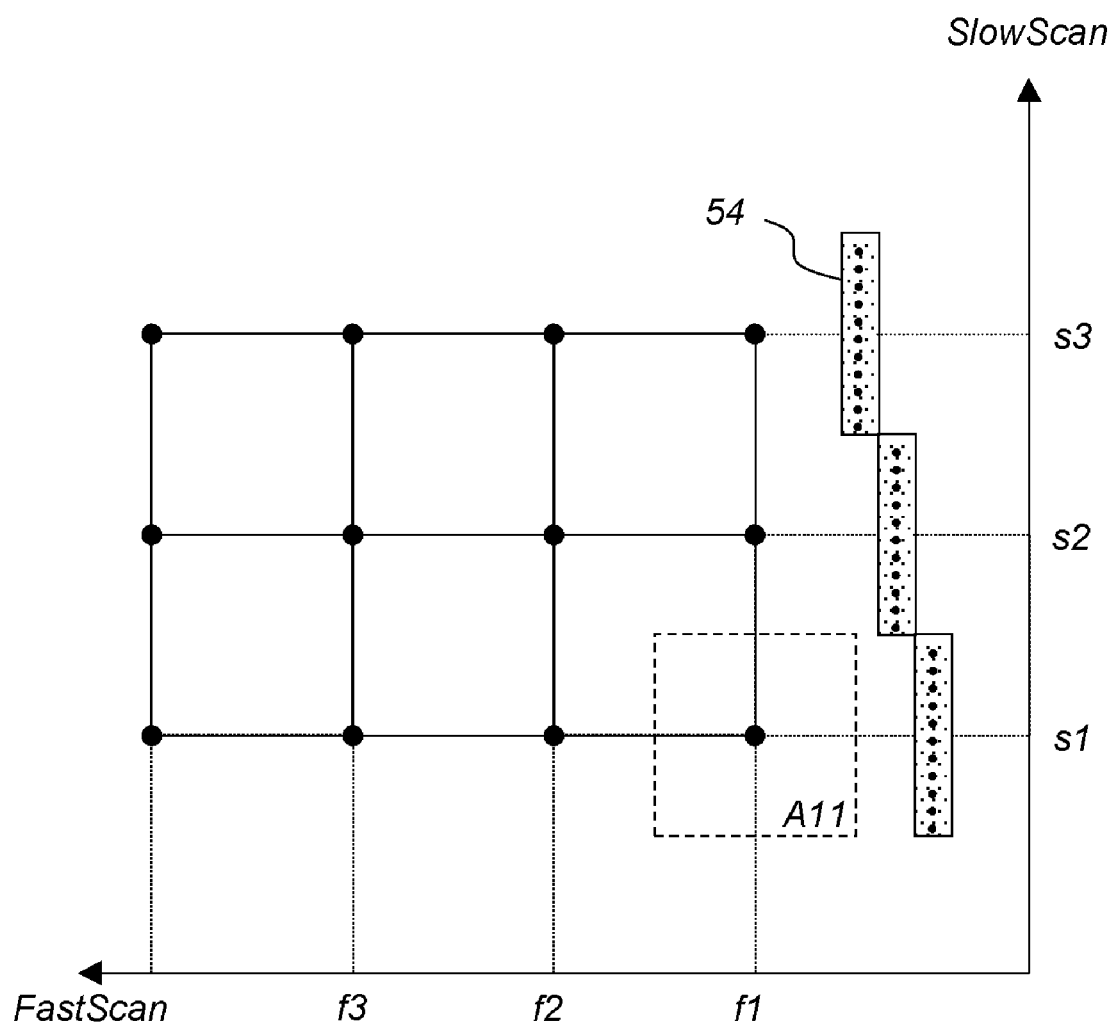
FIG. 11 shows a preferred embodiment of how calibration data or calibration correction values may be associated with grid points of a calibration grid covering the printing area.

The print head alignment in the y-direction, the bidirectional offset calibration and the throw distance calibration may be used in calculating spatial fire corrections for each print head and each print position on the printing medium. (The term "fire" is often used in ink jet printing and is equivalent to the above used term "ejection".) The spatial fire correction may be used when printing in bidirectional print mode, when changing fast scan velocities, for compensating throw distance variations, or for aligning the print heads in the y-direction in any print mode. A controller may store these corrections and apply them in real-time to adjust the fire position of drops to ensure correct landing of all the dots during the printing. Not applying corrections means that the fire position is identical to the print position. Spatial fire corrections may be calculated for each printing element and for each print position of the printing element or print head across the printing medium, and stored in a print head controller; provided the print head electronics are able to apply these corrections to individual printing elements during the printing. In another preferred embodiment using print head electronics that only allow spatial correction of the fire position for the complete array of printing elements, it may be more preferable to calculate and store an average correction value for the complete array of printing elements. In still another preferred embodiment, spatial fire corrections are only calculated for a discrete number of positions across the printing medium (samples). Interpolation techniques may be used to calculate the fire position offset at a particular print position, based on these samples. In a preferred embodiment, the fire position offset at a particular print position is calculated in real-time. Averaging across the array of printing elements and sampling across the printing medium significantly reduces the amount of data that is to be calculated during calibration and stored in the print head controller. In a preferred embodiment a reduced number of spatial fire correction values may be calculated and stored, based on a square grid of print positions, the size of the grid being the length of the array of printing elements of a print head. The grid may look like the one shown in FIG. 11. For each array of printing elements (i.e., for each print head in the present preferred embodiment), a basic look-up matrix is set up with spatial correction values for all fast scan velocities used, for both the forward and backward fast scan direction, and for every grid point location addressable by the array of printing elements. In other words, the look-up matrix covers the entire addressable region of the printing medium for the array of printing elements, using the available fast scan and slow scan motion, but at a discrete grid in the fast scan and slow scan direction. This is illustrated in FIG. 11. The array of printing elements 52 is able to print in three adjacent swaths s1, s2 and s3 along the slow scan direction. For every grid point, an entry in the matrix provides a spatial fire correction value, representative for the area around the grid point, e.g., area A11 around grid point (f1,s1) corresponding with a 50-by-50 mm print area. Variations in throw distance are automatically coped with during calculation of the spatial fire correction values from the test patterns printed at the location of the grid point. The procedure finally results in a look-up matrix for each print head, stored in the print head controller. The look-up matrix contains sets of spatial fire correction values, i.e., one set for every print position, wherein each spatial fire correction value of a set corresponds with another operating point of the printer, i.e., another fast scan speed or direction or another throw-distance.

During printing, the spatial fire correction values calculated and stored for a discrete number of grid points are used to calculate in real-time fire position adjustments for every print position in between grid points, e.g., by 2D binomial interpolation executed in the print head controller. The fire position adjustments calculated and adapted in real-time at every print position ensure that ejected dots land on the printing medium at their targeted pixel position.

An advantage of using fire position adjustment, instead of fire frequency adjustment often used in the prior art, is that all calibration work and adjustment during printing is done in units of length and that timing is irrelevant. That is, calibration values are measured in units of length on a printed calibration test pattern and correction are made in units of length on print head shuttle position. In a preferred embodiment, correction values are stored in the look-up matrix in microns.

Calibrero

In the preferred embodiment described above, a print head's non-perpendicularity and position regarding column and row alignment may be adjusted using adjustment screws 22 and 32 of the HPD head positioning device. An alignment adjustment tool is provided, referred to herein as a "calibrero" robot, for accurately and reproducibly performing the adjustments to the HPD based on the calibration values calculated from printed calibration test patterns.

Figure 12:
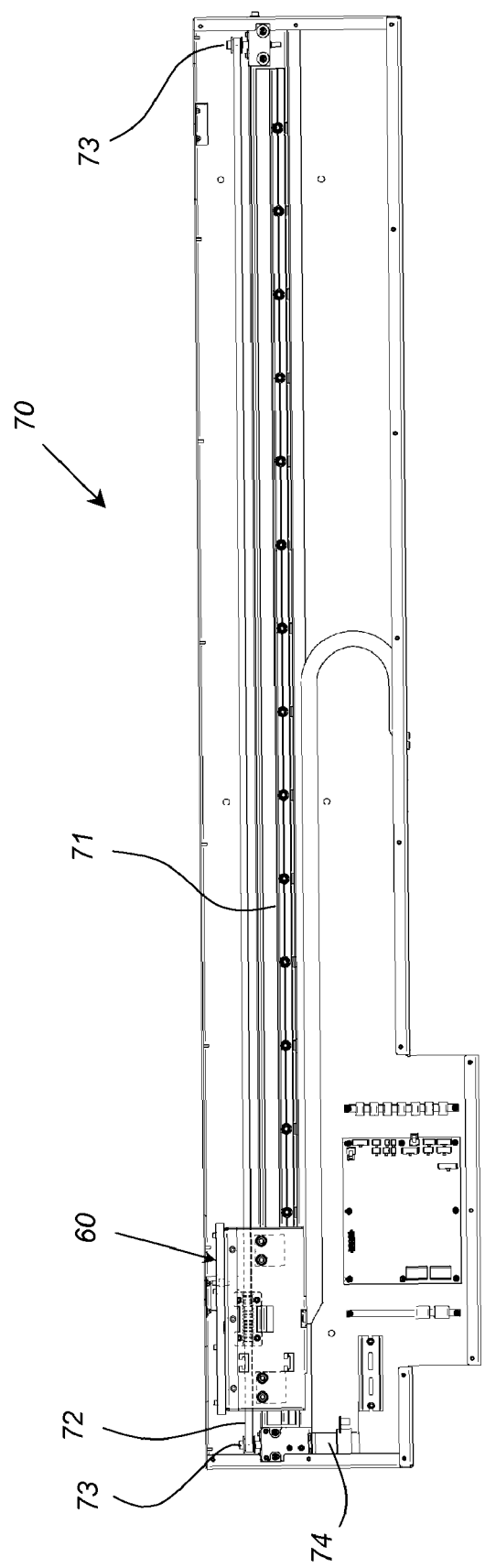
FIG. 12 shows a preferred embodiment of an alignment adjustment robot.
Figure 13:
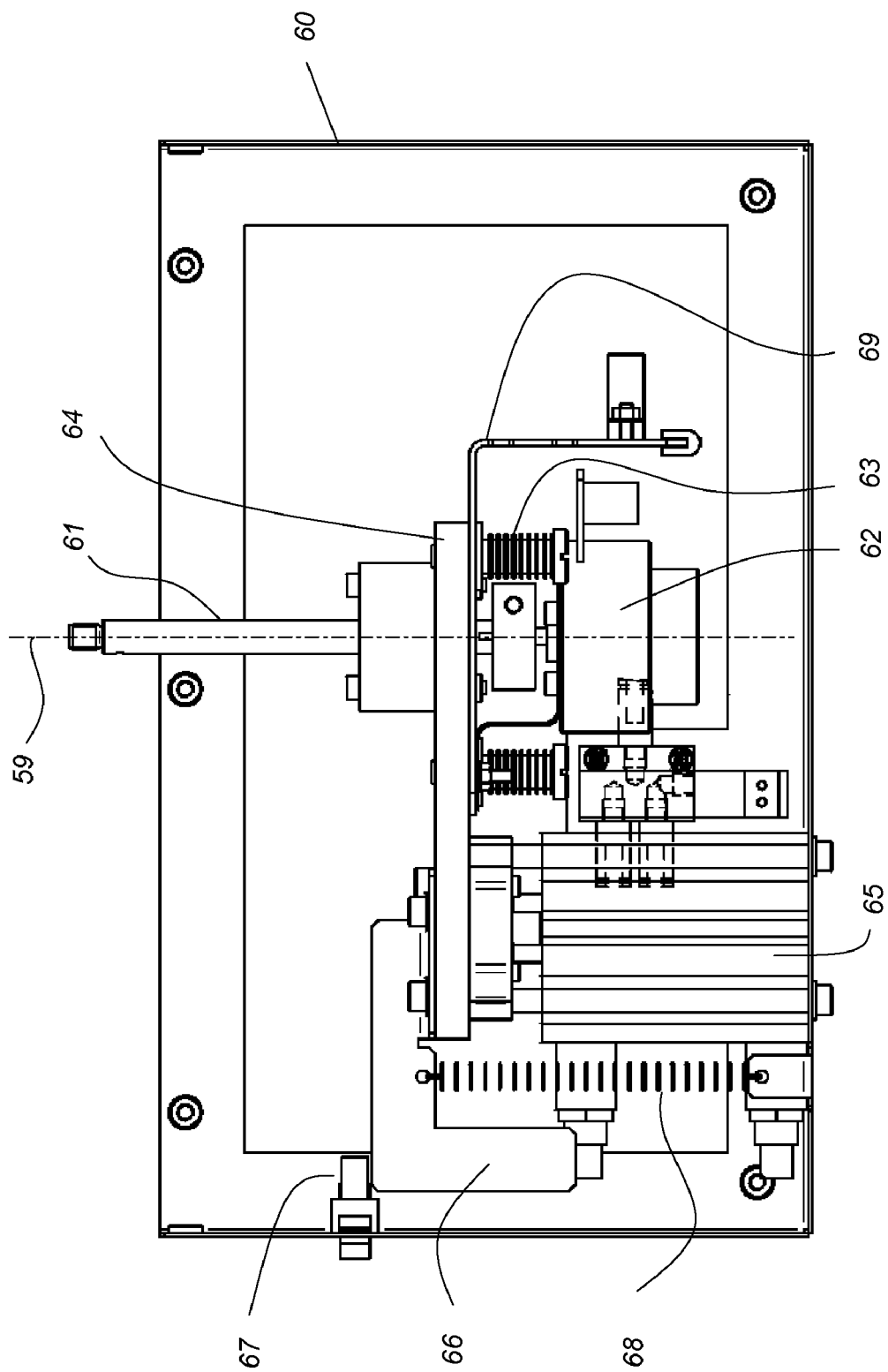
FIG. 13 shows a preferred embodiment of a carriage of the alignment adjustment robot including an automatic screwdriver.

As previously described, the adjustment screws 22 and 32 of the HPD device are operable from the back of the HPD, i.e., the side used to insert the print head in the HPD which is often also the side where most print head connections are made (drive electronics, ink connection, etc.), and from the front of the slide block, i.e., the side where the printing elements are located which is also the side facing the printing table. The adjustment screws may be equipped with a click mechanism that ensures a fixed rotation angle per click and locks the angular position of the screw when the screw is not operated, e.g., 20 clicks may correspond to 360° rotation of the screw. Operability from the back of the HPD is provided for manual adjustment by an operator, based on instructions displayed on a user interface by the calscan software. Operability from the front of the HPD is provided for automatic adjustment by the calibrero robot, based on instruction from the calscan software. The front of the HPD, i.e., the front of the slide block used to mount the HPD onto the base plate of the print head shuttle, becomes accessible when the print head shuttle is moved sideways on the printing table. This position may be a service position used for print head maintenance, cleaning, etc. and also calibration. When the print head shuttle is in the service position, the area underneath the shuttle may be used for installing automated tooling for maintenance and calibration processes. The calibrero robot is installed in the service area underneath the print head shuttle. The calibrero robot in this preferred embodiment preferably is an electric screwdriver mounted on a positioning device, but may be any tool that is suited for adjusting a print head positioning device. In this particular embodiment the screwdriver is the appropriate tool for adjusting the position of a screw. The positioning device allows for x-positioning of the screwdriver relative to the HPDs on the base plate of the print head shuttle. The x-positioning of the screwdriver is achieved by a linear drive system operating along the slow scan direction. The y-positioning of the screwdriver relative to the HPD is achieved by the accurate fast scan drive system that operates the print head shuttle and brings the HPD within range of the screwdriver. In a preferred embodiment illustrated in FIG. 12, a calibrero robot 70 is equipped with a linear drive system for positioning the screwdriver along the slow scan direction. The linear drive system is based on a carriage 60 running on a guide rail 71 and driven by a motor 74, a timing belt 72, and a set of pulleys 73. Other preferred embodiments may be used as well. A preferred embodiment of a carriage 60 is shown in FIG. 13. A screwdriver 61 is mounted on the carriage and can move up and down via a pneumatic cylinder 65. The pneumatic cylinder allows the screwdriver to engage with the screwhead of the adjustment screw in the HPD. The screwdriver is rotated by an electric motor 62. A configuration of three spring-loaded screws 63 pushes bracket 69, with the screwdriver and electrical motor assembly mounted thereon, up against a mounting plate 64 on the pneumatic cylinder 65. The spring-loaded screws restrict the forces of the screwdriver onto the adjustment screw of the HPD, i.e., the full power of the pneumatic cylinder is limited to and linked with the compressibility of the springs used. After positioning of the calibrero carriage underneath one of the adjustment screws, the screwdriver moves upward to search the screwhead (e.g., a hexagonal pocket) of the adjustment screw in the slide block of the HPD. The hole in the slide block, wherein the screwhead is recessed, may be conical for the purpose of guiding the screwdriver towards the screwhead. A second functionality of the spring-loaded screws 63 therefore may be to allow an angled position of the screwdriver axis 59 relative to the vertical axis to facilitate the guiding of the screwdriver towards the screwhead, in case a misalignment between the position of the calibrero carriage and the adjustment screw occurs. The engagement of the screwdriver key with the screwhead is monitored by controlling the torque of the electric motor of the screwdriver. When the engagement takes place, the torque of the electric motor will increase. Before the screwdriver starts adjusting the adjustment screw, the screwdriver angle is aligned with the actual angular position of the adjustment screw, i.e., the screwdriver is aligned with the actual "click" of the adjustment screw. Engagement and alignment of the screwdriver with the adjustment screw may be achieved simultaneously. In a next step, the calscan software will instruct the calibrero robot to rotate the adjustment screw an exact amount of rotations with a precision of one "click". An encoder may provide feedback about the actual rotation angle of the screwdriver. During rotation of the adjustment screws on the HPD, the HPD may reposition itself relative to the print head location datums in the print head carriage base plate. A third functionality of the spring-loaded screws 63 therefore may be to allow an angled position of the screwdriver axis 59 to follow the screwhead of the adjustment screw as the HPD repositions itself, without the need to reposition the calibrero carriage simultaneously. After setting the adjustment screw of the HPD according to the calibration value calculated by the calscan, the screwdriver is lowered to move away from the HPD and the front of the print head and to allow repositioning of the calibrero carriage in line with a next adjustment screw. A "withdrawn" position of the screwdriver may be detected to ensure that the calibrero robot will not interfere with the front side of the print heads, HPDs and other elements protruding underneath the print head shuttle, before starting the repositioning of the calibrero carriage in the xy-plane. The "withdrawn" position detection may be achieved using a bracket 66 and an optical sensor 67, as shown in FIG. 13. Other detection systems, known from automation technology, may be used. The bracket spring 68 ensures a withdrawn position of the screwdriver when the pneumatic cylinder is not powered on.

The calibrero robot may be used in the print head alignment process. This complete process may start with the printing of a calibration test pattern and scanning the printed pattern with a calscan module. Based on the scanned test pattern, the calscan software may then calculate a number of calibration values that can be used to physically adjust the alignment of the arrays of printing elements on the print head shuttle or can used as software corrections (e.g., spatial fire corrections) during the printing. The aim of these adjustments is to improve the alignment of printed dots onto the printing medium and as such improve global print quality. The step of physically adjusting the alignment of the arrays of printing elements may start by moving the print head shuttle along the y-direction or fast scan direction and positioning the shuttle right above the operating window of the calibrero robot. A complete column of HPDs is now within reach of the calibrero screwdriver which is moveable along the x-direction or slow-scan direction. Positioning of the print head shuttle is performed by the very accurate fast scan drive system that is also used during printing. After adjusting the alignment of the arrays of printing elements in the column, by repositioning of the HPDs relative to the print head shuttle base plate, the print head shuttle may be repositioned so that a next column of HPDs comes within the operating window of the calibrero robot.

In the event that one of the HPD adjustment screws gets out of range, the HPD adjustments already executed may be recalculated and redone with a proper offset to allow that one HPD adjustment screw to be operated within its range and still keep the targeted alignment of the arrays of printing elements relative to each other.

Automation

An automated calibration solution may include the steps of (1) instructing the printer driver to print a number of calibration test patterns; (2) scanning the printed calibration test pattern via a calscan camera capturing high resolution image frames and calculating calibration values for the print heads on the basis of these images; (3) adjusting the print head position where necessary via adjustment screws on a head positioning device, by a calibrero robot, to align the print heads relative to each other and to the shuttle movement; (4) storing spatial fire correction values in the print head controllers; (5) instructing the printer driver to print a number of calibration test patterns to verify the calibration; and (6) either leaving or restarting the calibration process on the basis of the last printed calibration test patterns.

One or more of the calibration steps may be performed manually. The adjustment of the HPD positions may for example be performed manually. A calibration user interface may then instruct an operator to perform a calibration, and provide him with HPD identification (e.g., row and column coordinates) and adjustment values (e.g., x clicks clockwise on screw 32 and y clicks counterclockwise on screw 22). The operator may turn the HPD adjustment screws via the backside of the HPD device and confirm the adjustment at the calibration user interface. The user interface may then provide the operator with instructions for a next HPD adjustment, etc.

Alternative or Additional Preferred Embodiments

The accuracy of the calibration procedure may be increased by increasing the number of dots used to print the lines of the calibration test pattern. In the preferred examples of the present invention, four printed dots are preferably used to define a line but this amount may be altered as required. Increasing the number of dots in a printed line may increase the amount of data that can be used in the statistics for calculating the center of gravity of the printed line. A number of algorithms are available to calculate the center of gravity of a line of adjacent printed dots, such as the algorithms used in image quality analysis products commercially available from QEA or ImageXpert. One example may be based on the calculation of the center of mass of each of the individual dots, fitting a straight line through these centers and using the center of this line to represent the center of gravity of the printed line in the calibration test pattern.

The accuracy of the calibration procedure also depends on the quality of the printed dots (shape, size, density). Highly ink absorbing receiver media will reduce the density of the printed dots and reduce contrast, making it more difficult for the image analysis system to define the dot circumference and the center of mass. When the receiver medium shows a significant and uncontrolled dot spread, the calculated center of mass of the printed dots will not necessarily coincide with the landing position of the drop on the receiver medium. The calibration procedure may therefore benefit from using a curable ink for printing the calibration test pattern. The curable ink is instantly (and at least partially) cured after landing on the receiver medium so as to fix the location of the printed dots on the receiver medium. Often this will also keep the colorant on the surface of the receiver medium, being an advantage towards printed dot density and contrast. The size of the printed dot should not be too small for the calscan camera to be able to digitally represent the printed dot, i.e., dot size and camera resolution should be matched.

In the discussion above, there was little reference towards color registration or alignment of print heads jetting different colors of ink. That is because the calibration procedure aims at aligning arrays of printing elements relative to each other and is therefore intrinsically independent of color. For the purpose of properly scanning color printed dots, the calscan camera system may be extended with suitable color filters and/or switchable RGB LED illumination.

Calibration of the printing medium (see next paragraph) and throw-distance may be performed at regular positions across the printable area of the printing medium. The calibration test pattern may therefore include several patches, at regular positions across the printable area, that can be used to calculate positional or regional calibration correction values (see also FIG. 11). The patches may be identical or include position specific information.

In the calibration and print head alignment process, the calscan module has been used to retrieve image frames from the printed calibration test pattern, the purpose of the image frames being to gather positional information of printed dots on the printing medium and using this information for the alignment of the array of printing elements. The calscan module may also be used to gather information on print quality parameters like dot size and dot shape, and use this information for the calibration of the printing process. The additional information may for example be used to determine the optimal print resolution for a given drop volume and given wetting properties (form factor) of the printing medium, or it may be used to determine the optimal drop volume for a given print resolution and given wetting properties (form factor) of the printing medium. (The latter option may require the use of a print head where a drop volume of the ejected drops is adjustable, such as the Omnidot 760 available from Xaar plc (UK).) Other parameters that may be relevant in this discussion are printing medium pre- treatment, ink type, ink drying settings (e.g., time between drop landing and UV-curing of the drop), etc.

In the description of the digital printer in which the preferred embodiments of the present invention may be used, the printing medium is fixed during the printing and the print head shuttle can move in a fast scan and slow scan direction to cover the entire printable area. The present invention may however also be used with other swath printer configurations, e.g., configurations where the slow scan movement of the print head shuttle relative to the printing medium is implemented by moving the printing medium relative to a fixed print head shuttle location in the slow scan direction. Also other types of printing media and transport systems may be used such as in web printing.

In a preferred embodiment the calscan module is mounted on the print head shuttle. This avoids the need for an additional linear motion drive system for moving the calscan module in the fast scan direction. However, in other printer configuration this may not be the preferred setup and the calscan module may be operated in x and y direction completely independent from the print head shuttle drive controls.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A method for aligning printing of dots generated by at least one array of printing elements of an ink jet printing apparatus, the method comprising the steps of:
  printing a calibration test pattern on a printing medium;
  scanning the printed calibration test pattern;
  determining at least one calibration value based on the scanned calibration test pattern; and
  adjusting the alignment of the at least one array of printing elements based on the at least one calibration value; wherein
  the step of adjusting the alignment of the at least one array of printing elements further comprises:
    positioning an alignment adjustment tool relative to the at least one array of printing elements;
    automatically adjusting the alignment of the at least one array of printing elements; and
  the step of positioning the alignment tool relative to the at least one array of printing elements includes moving the alignment adjustment tool to a position to engage with an adjusting device arranged to adjust the alignment of the at least one array of printing elements.

2. A method for aligning printing of dots generated by at least one array of printing elements of an ink jet printing apparatus, the method comprising the steps of:
  printing a calibration test pattern on a printing medium;
  scanning the printed calibration test pattern;
  determining at least one calibration value based on the scanned calibration test pattern; and
  adjusting the alignment of the at least one array of printing elements based on the at least one calibration value; wherein
  the step of adjusting the alignment of the at least one array of printing elements further comprises:
    positioning an alignment adjustment tool relative to the at least one array of printing elements; and
    automatically adjusting the alignment of the at least one array of printing elements; wherein
  the step of positioning the alignment adjustment tool relative to the at least one array of printing elements includes:
    moving the alignment adjustment tool in a slow-scan direction and moving the at least one array of printing elements in a fast-scan direction.

3. The method according to claim 2, wherein the step of automatically adjusting the alignment of the at least one array of printing elements includes:

engaging the alignment adjustment tool with an adjusting device arranged to adjust the alignment of the at least one array of printing elements, and operating the adjusting device with the alignment adjustment tool.

4. The method according to claim 3, wherein the adjusting device includes adjustment screws, and the alignment adjustment tool includes an automatic screwdriver.

5. An ink jet printing system comprising:
at least one array of printing elements arranged to print a calibration test pattern onto a receiver medium;
a scanning device arranged to scan the printed calibration test pattern;
a calculating device arranged to calculate a calibration value based on the scanned calibration test pattern; and
an adjusting device arranged to adjust the alignment of the at least one array of printing elements according to the calculated calibration value; wherein
the ink jet printing system further includes an alignment adjustment tool arranged to automatically operate the adjusting device, and a positioning device arranged to move the alignment adjustment tool to a position to engage with the adjusting device.

6. An ink jet printing system comprising:
at least one array of printing elements arranged to print a calibration test pattern onto a receiver medium;
a scanning device arranged to scan the printed calibration test pattern;
a calculating device arranged to calculate a calibration value based on the scanned calibration test pattern; and
an adjusting device arranged to adjust the alignment of the at least one array of printing elements according to the calculated calibration value; wherein
the ink jet printing system further includes an alignment adjustment tool arranged to automatically operate the adjusting device, and a positioning device arranged to position the alignment adjustment tool relative to the adjusting device; and
the positioning device includes:
a transversal drive system arranged to move the alignment adjustment tool relative to the adjusting device along a slow-scan direction;
a print head shuttle drive system arranged to move the at least one array of printing elements relative to the alignment adjustment tool in a fast-scan direction; and
a lift drive system arranged to move the alignment adjustment tool relative to the adjusting device along a direction substantially perpendicular to the fast-scan and the slow-scan direction and to engage the alignment adjustment tool with the adjusting device.

7. The ink jet printing system according to claim 6, wherein an axis of the alignment adjustment tool is movably mounted onto the lift drive system to create and preserve engagement between the alignment adjustment tool and the adjusting device.

8. The ink jet printing system according to claim 5, wherein the alignment adjustment tool includes an automatic screwdriver.

* * * * *